US008624709B2

(12) United States Patent
Estes et al.

(10) Patent No.: US 8,624,709 B2
(45) Date of Patent: Jan. 7, 2014

(54) SYSTEM AND METHOD FOR CAMERA CONTROL IN A SURVEILLANCE SYSTEM

(75) Inventors: Andrew D. Estes, Huntsville, AL (US); Johnny E. Frederick, Meridianville, AL (US)

(73) Assignee: Intergraph Technologies Company, Las Vegas, NV (US)

( * ) Notice: Subject to any disclaimer, the term of this patent is extended or adjusted under 35 U.S.C. 154(b) by 0 days.

(21) Appl. No.: 13/458,525

(22) Filed: Apr. 27, 2012

(65) Prior Publication Data

US 2012/0212611 A1 Aug. 23, 2012

Related U.S. Application Data

(63) Continuation of application No. 12/946,413, filed on Nov. 15, 2010, now Pat. No. 8,193,909, which is a continuation of application No. PCT/US2010/056691, filed on Nov. 15, 2010.

(51) Int. Cl.
*G08B 5/22* (2006.01)

(52) U.S. Cl.
USPC .......... 340/8.1; 340/539.22; 340/539.25; 340/549; 340/619; 340/937; 348/36; 348/143; 382/103; 345/426

(58) Field of Classification Search
USPC ........ 340/8.1, 937, 539.22, 539.25, 549, 619; 348/36–39, 143–159; 382/103
See application file for complete search history.

(56) References Cited

U.S. PATENT DOCUMENTS

| | | | | |
|---|---|---|---|---|
| 4,992,866 A * | 2/1991 | Morgan | ................. | 348/159 |
| 5,610,875 A * | 3/1997 | Gaiser | ................. | 367/75 |
| 5,834,158 A | 11/1998 | Hillmer | ................. | 430/296 |
| 5,854,632 A * | 12/1998 | Steiner | ................. | 345/426 |
| 5,872,594 A | 2/1999 | Thompson | ................. | 348/213 |
| 5,926,209 A * | 7/1999 | Glatt | ................. | 348/143 |
| 6,018,350 A * | 1/2000 | Lee et al. | ................. | 345/426 |
| 6,266,100 B1 * | 7/2001 | Gloudemans et al. | ........ | 348/587 |
| 6,597,406 B2 * | 7/2003 | Gloudemans et al. | ........ | 348/587 |
| 6,680,746 B2 | 1/2004 | Kawai et al. | ................. | 348/211.9 |
| 6,909,458 B1 * | 6/2005 | Suzuki et al. | ............. | 348/211.8 |
| 6,998,987 B2 * | 2/2006 | Lin | ................. | 340/573.1 |

(Continued)

FOREIGN PATENT DOCUMENTS

| | | | | |
|---|---|---|---|---|
| EP | 0747739 | | 12/1996 | ............. G06B 6/124 |
| EP | 747739 A2 * | | 12/1996 | ............. G02B 6/124 |

(Continued)

OTHER PUBLICATIONS

Ashcraft, "Projecting an Arbitrary Latitude and Longitude onto a Tangent Plane," Brigham and Young University, Department of Electrical and Computer Engineering, 4 pages, Jan. 21, 1999.

(Continued)

*Primary Examiner* — George Bugg
*Assistant Examiner* — Paul Obiniyi
(74) *Attorney, Agent, or Firm* — Sunstein Kann Murphy & Timbers LLP

(57) ABSTRACT

A method and a system for calibrating a camera in a surveillance system. The method and system use a mathematical rotation between a first coordinate system and a second coordinate system in order to calibrate a camera with a map of an area. In some embodiments, the calibration can be used to control the camera and/or to display a view cone on the map.

24 Claims, 15 Drawing Sheets

(56) References Cited

U.S. PATENT DOCUMENTS

| | | | | |
|---|---|---|---|---|
| 7,019,644 | B2* | 3/2006 | Barrie | 340/539.13 |
| 7,151,562 | B1* | 12/2006 | Trajkovic | 348/211.13 |
| 7,263,207 | B2* | 8/2007 | Lee et al. | 382/103 |
| 7,280,134 | B1* | 10/2007 | Henderson et al. | 348/117 |
| 7,385,626 | B2* | 6/2008 | Aggarwal et al. | 348/143 |
| 7,425,986 | B2* | 9/2008 | Kawai et al. | 348/211.3 |
| 7,522,186 | B2* | 4/2009 | Arpa et al. | 348/153 |
| 7,583,815 | B2* | 9/2009 | Zhang et al. | 382/103 |
| 7,629,995 | B2* | 12/2009 | Salivar et al. | 348/143 |
| 7,750,936 | B2* | 7/2010 | Provinsal et al. | 348/143 |
| 7,884,849 | B2* | 2/2011 | Yin et al. | 348/143 |
| 7,929,016 | B2* | 4/2011 | Yoshida et al. | 348/159 |
| 7,940,299 | B2* | 5/2011 | Geng | 348/143 |
| 7,956,891 | B2* | 6/2011 | Uchihara | 348/143 |
| 7,990,422 | B2* | 8/2011 | Ahiska et al. | 348/218.1 |
| 8,194,912 | B2* | 6/2012 | Kitaura et al. | 382/100 |
| 8,237,791 | B2* | 8/2012 | Chen et al. | 348/143 |
| 2002/0050988 | A1* | 5/2002 | Petrov et al. | 345/418 |
| 2003/0071891 | A1* | 4/2003 | Geng | 348/39 |
| 2004/0119819 | A1* | 6/2004 | Aggarwal et al. | 348/143 |
| 2004/0227656 | A1* | 11/2004 | Asakura et al. | 341/176 |
| 2005/0024206 | A1* | 2/2005 | Samarasekera et al. | 340/541 |
| 2005/0036036 | A1* | 2/2005 | Stevenson et al. | 348/211.99 |
| 2005/0146605 | A1 | 7/2005 | Lipton et al. | 348/143 |
| 2006/0028548 | A1* | 2/2006 | Salivar et al. | 348/143 |
| 2006/0028550 | A1* | 2/2006 | Palmer et al. | 348/155 |
| 2006/0033813 | A1* | 2/2006 | Provinsal et al. | 348/143 |
| 2006/0229885 | A1* | 10/2006 | Kodama | 705/1 |
| 2007/0024706 | A1* | 2/2007 | Brannon et al. | 348/142 |
| 0070/1920070 | | 3/2007 | Yin et al. | 348/36 |
| 2007/0070190 | A1* | 3/2007 | Yin et al. | 348/36 |
| 2007/0122058 | A1* | 5/2007 | Kitaura et al. | 382/284 |
| 2007/0146484 | A1* | 6/2007 | Horton et al. | 348/159 |
| 2007/0236570 | A1* | 10/2007 | Sun et al. | 348/159 |
| 2007/0291104 | A1* | 12/2007 | Petersen et al. | 348/14.01 |
| 2008/0031493 | A1 | 2/2008 | Brogren et al. | 382/103 |
| 2008/0049099 | A1* | 2/2008 | Shih et al. | 348/38 |
| 2008/0088706 | A1* | 4/2008 | Girgensohn et al. | 348/207.99 |
| 2008/0211929 | A1* | 9/2008 | Uchihara | 348/231.99 |
| 2008/0231708 | A1* | 9/2008 | Morimoto et al. | 348/159 |
| 2008/0243908 | A1* | 10/2008 | Aasman et al. | 707/102 |
| 2008/0291278 | A1* | 11/2008 | Zhang et al. | 348/159 |
| 2008/0291279 | A1* | 11/2008 | Samarasekera et al. | 348/159 |
| 2009/0010493 | A1* | 1/2009 | Gornick et al. | 382/103 |
| 2009/0040302 | A1* | 2/2009 | Thompson | 348/143 |
| 2009/0167867 | A1* | 7/2009 | Lin et al. | 348/169 |
| 2009/0237510 | A1* | 9/2009 | Chen et al. | 348/159 |
| 2009/0262195 | A1* | 10/2009 | Yoshida et al. | 348/159 |
| 2009/0262196 | A1* | 10/2009 | Salivar et al. | 348/159 |
| 2010/0013917 | A1* | 1/2010 | Hanna et al. | 348/143 |
| 2010/0020178 | A1* | 1/2010 | Kleihorst | 348/175 |
| 2010/0033567 | A1* | 2/2010 | Gupta et al. | 348/143 |
| 2010/0141767 | A1* | 6/2010 | Mohanty et al. | 348/159 |
| 2010/0142401 | A1* | 6/2010 | Morris | 370/254 |
| 2010/0208941 | A1* | 8/2010 | Broaddus et al. | 382/103 |
| 2010/0245588 | A1* | 9/2010 | Waehner et al. | 348/169 |
| 2010/0263709 | A1* | 10/2010 | Norman et al. | 136/246 |
| 2010/0321473 | A1* | 12/2010 | An | 348/47 |
| 2011/0109747 | A1* | 5/2011 | Forrester et al. | 348/152 |
| 2011/0122250 | A1* | 5/2011 | Lee et al. | 348/155 |
| 2011/0188762 | A1* | 8/2011 | Grindstaff et al. | 382/218 |
| 2011/0193935 | A1* | 8/2011 | Gorzynski | 348/14.08 |
| 2011/0193936 | A1* | 8/2011 | Gai | 348/36 |
| 2011/0199461 | A1* | 8/2011 | Horio et al. | 348/46 |
| 2011/0199484 | A1* | 8/2011 | Uchihara | 348/143 |
| 2012/0206607 | A1* | 8/2012 | Morioka | 348/159 |

FOREIGN PATENT DOCUMENTS

| | | | | |
|---|---|---|---|---|
| JP | 2006214735 | | 8/2006 | G01B 11/00 |
| JP | 2006214735 A | * | 8/2006 | |
| KR | 1020090050379 | | 5/2009 | H04N 7/18 |
| KR | 1020100005378 | | 1/2010 | H04N 7/18 |

OTHER PUBLICATIONS

Bourke, "Determining If a Point Lies on the Interior of a Polygon," accessible at the following link: http://local.wasp.uwa.edu.aukpbourke/geometry/insidepoly/, 6 pages, Nov. 20, 1987.
Chen et al., "An Efficient Approach for the Calibration of Multiple PTZ Cameras," IEEE Transactions on Automation Science and Engineering, vol. 4, No. 2, pp. 286-293, Apr. 2007.
Eigensystems, "Jacobi Transformations of a Symmetric Matrix," Eigensystems, pp. 463-469, 1992.
Horn, "Closed-form solution of absolute orientation using unit quaternions," Journal of the Optical of America A, vol. 4, pp. 629-642, Apr. 1987.
Junejo et al, "Refining PTZ Camera Calibration," Pattern Recognition, 4 pages, 2008.
Robinault et al., "Self-calibration and control of a PTZ camera based on a spherical mirror," IEEE, Advanced Video and Signal Based Surveillance, pp. 244-249, 2009.
Thirthala et al., Calibration of Pan-Tilt-Zoom (PTZ) Camera and Omni-directional Cameras, IEEE Computer Society Conference on Computer Vision and Pattern Recognition, 1 page, 2005.
International Searching Authority, International Search Report—International Application No. PCT/US2010/056691, dated Aug. 3, 2011, together with the Written Opinion of the International Searching Authority, 9 pages.

* cited by examiner

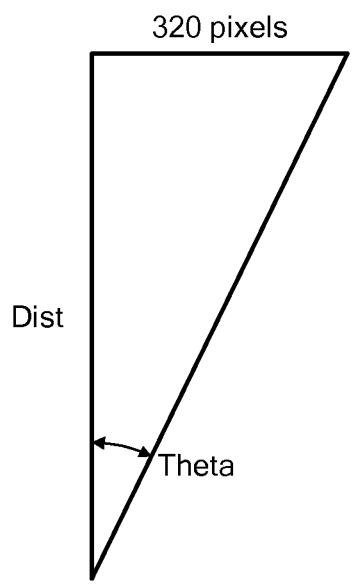 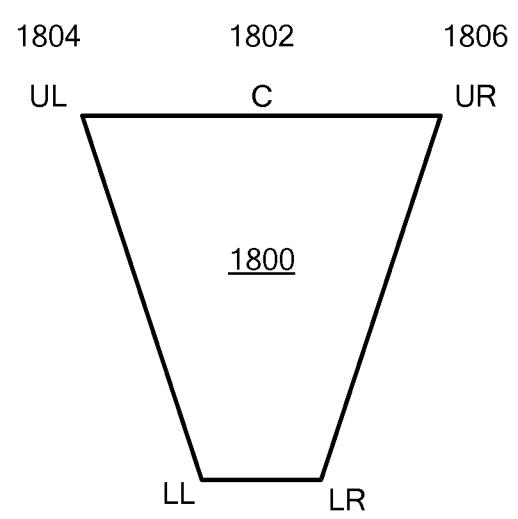
*FIG. 17*     *FIG. 18*

SYSTEM AND METHOD FOR CAMERA CONTROL IN A SURVEILLANCE SYSTEM

The present application is a continuation of U.S. patent application Ser. No. 12/946,413, filed Nov. 15, 2010, now U.S. Pat. No. 8,193,909, which is a continuation of PCT Application No. PCT/US 10/56691, filed Nov. 15, 2010, the full disclosures of which are incorporated by reference herein in their entirety.

TECHNICAL FIELD

The present invention relates to methods of camera control, and more particularly to methods of camera control in a surveillance system.

BACKGROUND ART

Surveillance systems use cameras to survey areas of interest. The cameras produce video feeds that can be displayed to a user. In this manner, the user can remotely observe an area of interest. In some cases, the cameras in the surveillance system are fixed and the user cannot change their field of view. In other cases, however, the cameras and their field of views can be adjusted through user control. Typically, the control is performed using a manual control, such as a joystick. Thus, if the video feed includes a moving object, the user manually controls the camera to follow the moving object. This manual control of the camera is not very efficient, particularly if the user has a limited time period to capture and/or respond to the moving object. These problems are further compounded if the camera is not accurately and properly mounted (e.g., to be level with the ground). In another example, image analysis is used to automatically control the camera to follow an object within the field of view. The shortcoming with this approach is that the image analysis cannot be performed unless the object is within the field of view of the camera. If the moving object is not within the field of view, the user must manually guide the camera to capture the moving object within its field of view.

SUMMARY

Illustrative embodiments of the present invention are directed to a method, a system, and a computer readable medium encoded with instructions for calibrating a surveillance system. Illustrative embodiments of the present invention include displaying a video feed from a camera that has an orientation characterized by pan, zoom, and tilt coordinates. Exemplary embodiments further include displaying a map of an area that is characterized by geospatial coordinates. A user selects at least three pairs of points using an input device. A first point of the pair is selected in the map and a second point of the pair is selected from the video feed. The first point and the second point correspond to the same geographic location. The three points selected in the map are converted from geospatial coordinates into Cartesian coordinates defined by a first coordinate system. The three points selected in the video feed are converted from pan, zoom, and tilt coordinates into Cartesian coordinates defined by a second coordinate system. A mathematical rotation between the first coordinate system and the second coordinate system is then determined based upon the Cartesian coordinates for the three pairs of points.

Various embodiments of the present invention also include allowing the user to select at least one point in the map using the input device. The geospatial coordinates for the selected point are converted into Cartesian coordinates defined by the first coordinate system and the mathematical rotation is applied to those Cartesian coordinates to determine Cartesian coordinates defined by the second coordinate system. The Cartesian coordinates defined by the second coordinate system are then further converted into pan and tilt coordinates for the selected point. Orientation instructions are then provided to the camera based upon the pan and tilt coordinates for the selected point.

In additional or alternative embodiments of the present invention, coordinates from a sensor for a target are received and, if the coordinates for the target are not Cartesian coordinates defined by the first coordinate system, then they are converted into Cartesian coordinates defined by the first coordinate system. The mathematical rotation is applied to the Cartesian coordinates defined by the first Cartesian coordinate system to determine Cartesian coordinates defined by the second Cartesian coordinate system. The Cartesian coordinates defined by the second Cartesian coordinate system are converted into pan and tilt coordinates and orientation instructions are provided to the camera based upon the pan and tilt coordinates.

In another illustrative embodiment of the present invention, the video feed has upper left, upper right, lower left, and lower right corners. Exemplary embodiments of the invention further include determining effective pan and tilt angles for at least the lower left and lower right corners of the video feed based upon the pan, zoom, and tilt coordinates for the camera orientation. The effective pan and tilt angles for at least the lower left and lower right corners of the video feed are converted into Cartesian coordinates defined by the second coordinate system. The mathematical rotation is applied to the Cartesian coordinates defined by the second coordinate system to determine Cartesian coordinates defined by the first coordinate system for at least the lower left and lower right corners of the video feed. A view cone is determined using the Cartesian coordinates defined by the first coordinate system for at least the lower left and lower right corners of the video feed and based upon the upper left and upper right corners of the video feed. The view cone is displayed on the map.

Illustrative embodiments of the present invention are directed to a method, a system, and a computer readable medium encoded with instructions for controlling a camera that has an orientation characterized by pan, zoom, and tilt coordinates. Exemplary embodiments of the invention include displaying a map of an area that is characterized by geospatial coordinates. A user selects at least one point in the map using the input device. The geospatial coordinates for the selected point are converted into Cartesian coordinates defined by a first coordinate system that characterizes the map. A mathematical rotation is applied to the Cartesian coordinates for the selected point to determine Cartesian coordinates defined by a second coordinate system that characterizes a video feed from the camera. The mathematical rotation provides a conversion between the first coordinate system and the second coordinate system. The Cartesian coordinates defined by the second coordinate system are converted into pan and tilt coordinates for the selected point and orientation instructions are provided to the camera based upon at least the pan and tilt coordinates for the selected point. The video feed from the camera is then displayed according to the pan and tilt coordinates.

Illustrative embodiments of the present invention are directed to a method, a system, and a computer readable medium encoded with instructions for prioritizing video feeds from a plurality of cameras that have locations characterized by coordinates. Exemplary embodiment of the invention include receiving coordinates for a point of interest and determining whether the point of interest is within the viewing range of any of the plurality of the cameras. If more than one camera is within viewing range of the point of interest, the distances between the cameras and the point of interest are determined. Various embodiments of the present invention further include determining which of the cameras is the least distant from the point of interest. Orientation instructions are provided to the least distant camera based upon the coordinates of the point of interest and a video feed is displayed from the least distant camera.

Illustrative embodiments of the present invention are directed to a method, a system, and a computer readable medium encoded with instructions for tracking at least one target using a sensor and a camera that has an orientation characterized by pan, zoom, and tilt coordinates. Exemplary embodiments of the invention include receiving coordinates from the sensor for the target. If the coordinates for the target are not Cartesian coordinates defined by a first coordinate system characterizing the map, then the coordinates are converted into Cartesian coordinates defined by the first coordinate system. A mathematical rotation is applied to the Cartesian coordinates defined by the first coordinate system in order to determine Cartesian coordinates defined by a second coordinate system that characterizes a video feed from the camera. The mathematical rotation provides a conversion between the first coordinate system and the second coordinate system. The Cartesian coordinates defined by the second Cartesian coordinate system are converted into pan and tilt coordinates and orientation instructions are provided to the camera based upon the pan and tilt coordinates. The video feed from the camera is then displayed according to the pan and tilt coordinates.

Illustrative embodiments of the present invention are directed to a method, a system, and a computer readable medium encoded with instructions for displaying a view cone for a camera that has an orientation characterized by pan, zoom, and tilt coordinates. Exemplary embodiments of the present invention include displaying a map of an area, determining the view cone based upon the pan, zoom, and tilt coordinates for the camera, and displaying the view cone on the map.

Illustrative embodiments of the present invention are directed to a method, a system, and a computer readable medium encoded with instructions for displaying a view cone for a camera that has an orientation characterized by pan, zoom, and tilt coordinates. Exemplary embodiments of the present invention include displaying a map of an area that is characterized by geospatial coordinates. Effective pan and tilt angles are determined for at least the lower left and lower right corners of the video feed based upon the pan, zoom, and tilt coordinates for the camera orientation. The effective pan and tilt angles for at least the lower left and lower right corners of the video feed are converted into Cartesian coordinates defined by a second coordinate system that characterizes the video feed. A mathematical rotation is applied to the Cartesian coordinates for at least the lower left and lower right corners of the video feed to determine Cartesian coordinates defined by a first coordinate system that characterizes the map. The mathematical rotation provides a conversion between the first coordinate system and the second coordinate system. A view cone is then determined based upon the Cartesian coordinates, defined by the first coordinate system, for at least the lower left and lower right corners and based upon the upper left and upper right corners of the video feed. The view cone is then displayed on the map.

When the tilt coordinate for the camera is below the horizon, determining the view cone based upon the upper left and upper right corners of the video feed further includes determining effective pan and tilt angles for the upper left and upper right corners of the video feed based upon the pan, zoom, and tilt coordinates for the camera orientation. The effective pan and tilt angles for the upper left and upper right corners of the video feed are converted into Cartesian coordinates defined by the second coordinate system. The mathematical rotation is applied to the Cartesian coordinates to determine Cartesian coordinates defined by the first coordinate system for the upper left and upper right corners of the video feed. The view cone is determined based upon the Cartesian coordinates, defined by the first coordinate system, for the upper left, upper right, lower left and lower right corners.

When the tilt coordinate for the camera is above the horizon, determining the view cone based upon the upper left and upper right corners of the video feed includes determining effective tilt angles for the upper left and upper right corners of the video feed based upon the pan, zoom, and tilt coordinates for the camera. Coordinates, defined by the first coordinate system, for the upper left and upper right corners of the video feed are determined based upon a resolvable distance of the camera. The view cone is determined based upon the Cartesian coordinates, defined by the first coordinate system, for the upper left, upper right, lower left and lower right corners.

In further exemplary embodiments, the view cone is a polygon and the Cartesian coordinates, defined by the first coordinate system, for the upper left, upper right, lower left and lower right corners are the vertices of the polygon.

Illustrative embodiments of the present invention are directed to a method, a calibrated system, and a computer readable medium encoded with instructions for controlling a camera. Exemplary embodiments of the present invention include displaying a map of an area and determining Cartesian coordinates for a point of interest. The Cartesian coordinates are defined by a first coordinate system characterizing the map. Exemplary embodiments further include applying a mathematical rotation to the Cartesian coordinates for the point of interest to determine Cartesian coordinates defined by a second coordinate system that characterizes a video feed from the camera. The mathematical rotation provides a conversion between the first coordinate system and the second coordinate system. The Cartesian coordinates defined by the second coordinate system are converted into at least pan and tilt coordinates for the point of interest and orientation instructions are provided to the camera based upon at least the pan and tilt coordinates for the point of interest. The video feed from the camera is displayed according to the orientation instructions.

In all or some of the above described embodiments, the geospatial coordinates are latitude, longitude, and altitude coordinates. The input device is one or more of a mouse, a cursor, a crosshair, a touch screen, and a keyboard. The sensor is one or more of a camera, a radar, and a motion detector.

Furthermore, in all or some of the above described embodiments, the map of an area is displayed and the map is characterized by geospatial coordinates. In some embodiments, the location of at least one camera is displayed on the map. In additional or alternative embodiments, the location of at least one sensor is displayed on the map. Also, in some embodiments, the location of at least one target is displayed on the map.

In all or some of the above described embodiments, the mathematical rotation is determined by displaying a map of an area that is characterized by geospatial coordinates. A user selects at least three pairs of points using an input device. The first point of the pair is selected in the map and a second point of the pair being selected from the video feed. The first point and the second point corresponding to the same geographic location. The three points selected in the map are converted from geospatial coordinates into Cartesian coordinates defined by the first coordinate system. The at least three points selected in the video feed are converted from pan, zoom, and tilt coordinates into Cartesian coordinates defined by the second coordinate system. The mathematical rotation between the first coordinate system and the second coordinate system is determined based upon the Cartesian coordinates for the at least three pairs of points. In some embodiments, the mathematical rotation is a matrix.

BRIEF DESCRIPTION OF THE DRAWINGS

The foregoing features of the invention will be more readily understood by reference to the following detailed description, taken with reference to the accompanying drawings, in which:

FIG. 17 shows how an observable distance is calculated using a right triangle in accordance with one embodiment of the present invention; and FIG. 18 shows a view cone in accordance with one embodiment of the present invention.

DETAILED DESCRIPTION OF SPECIFIC EMBODIMENTS

Figure 1:
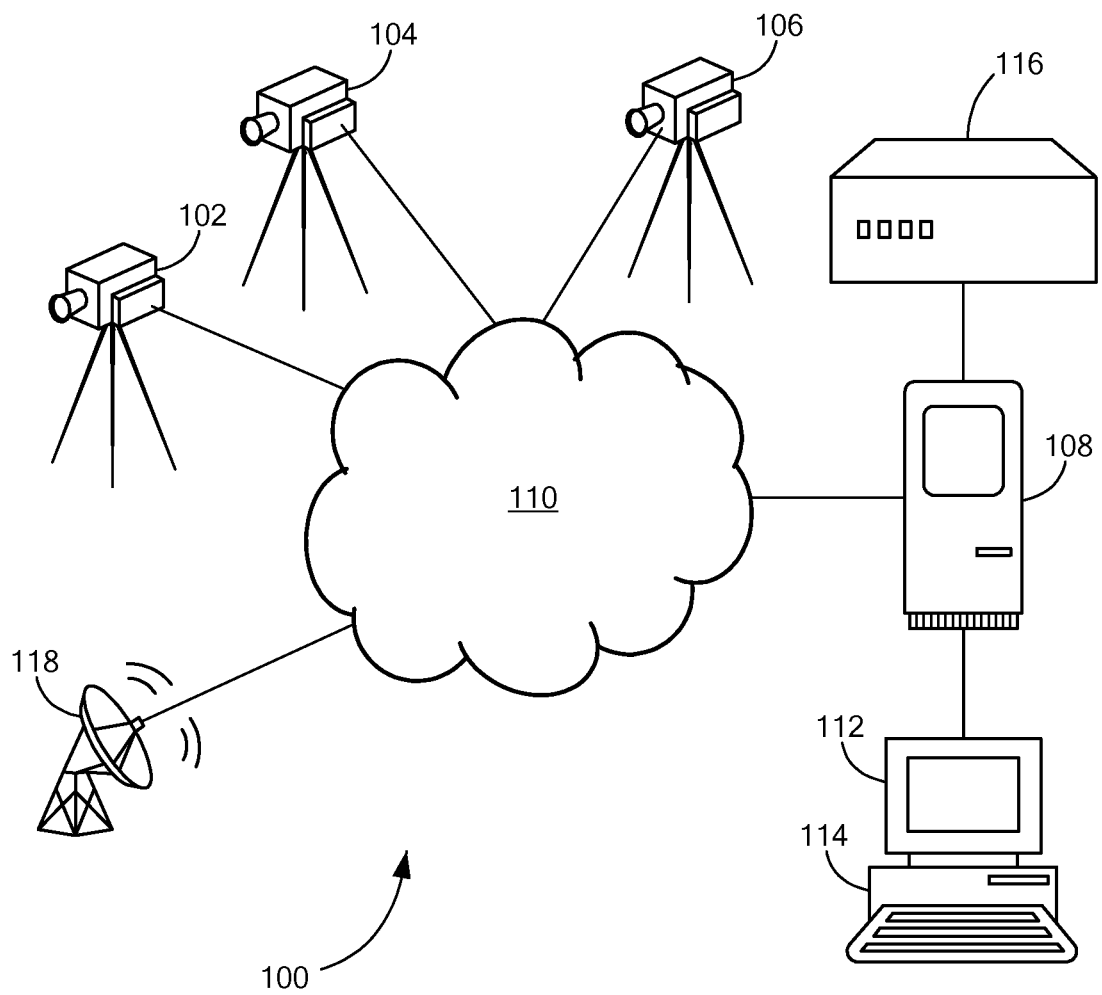
FIG. 1 shows a surveillance system in accordance with one embodiment of the present invention.

Illustrative embodiments of the present invention are directed to a surveillance system. FIG. 1 shows a surveillance system 100 in accordance with one embodiment of the present invention. Illustrative embodiments of the surveillance system include at least one camera 102. In other embodiments, such as the one shown in FIG. 1, the system includes a plurality of cameras 102, 104, 106. The cameras 102, 104, 106 are in electronic communication with a processor (e.g., a camera server) via, for example, a communications network 110. The processor 108 is also in communication with at least one display device such as a monitor 112. The display device 112 allows a user to view video feeds from the cameras 102, 104, 106. The system 100 also includes an input device 114 such as a computer mouse, a cursor, a crosshair, a keyboard, a menu, and/or a joy stick. In various embodiments, the display device 112 is also the input 114 device (e.g., touch screen). The input device 114 is in electronic communication with the processor 108 and allows a user to control the cameras 102, 104, 106 and to select points in the video feeds from each of the cameras.

In illustrative embodiments, the surveillance system also includes a geographic information system 116. The geographic information system 116 includes a database of maps of geographic areas (e.g., building floor plans and/or outdoor terrains). Each map includes geospatial coordinates definable by a geographic coordinate system (e.g., latitude, longitude, and altitude). In additional or alternative embodiments, the geospatial coordinates are definable a Cartesian Coordinate system.

In some embodiments, the processor 108 itself includes the geographic information system 116, however, in other embodiments, the geographic information system may be in communication with the processor via the communications network (e.g., internet) 110. The display device 112 is used to display the map and the input device 114 is used to select a points on the map. In various exemplary embodiments, a first display device may be used to display video feeds from the cameras 102, 104, 106 and a second display device is used to display the map. Additionally or alternatively, the surveillance system 100 may include at least one sensor 118 such as a camera, a radar, and/or a motion detector. The sensor 118 is in electronic communication with the processor 108 via, for example, the computer network 110.

Calibration

Figure 2:
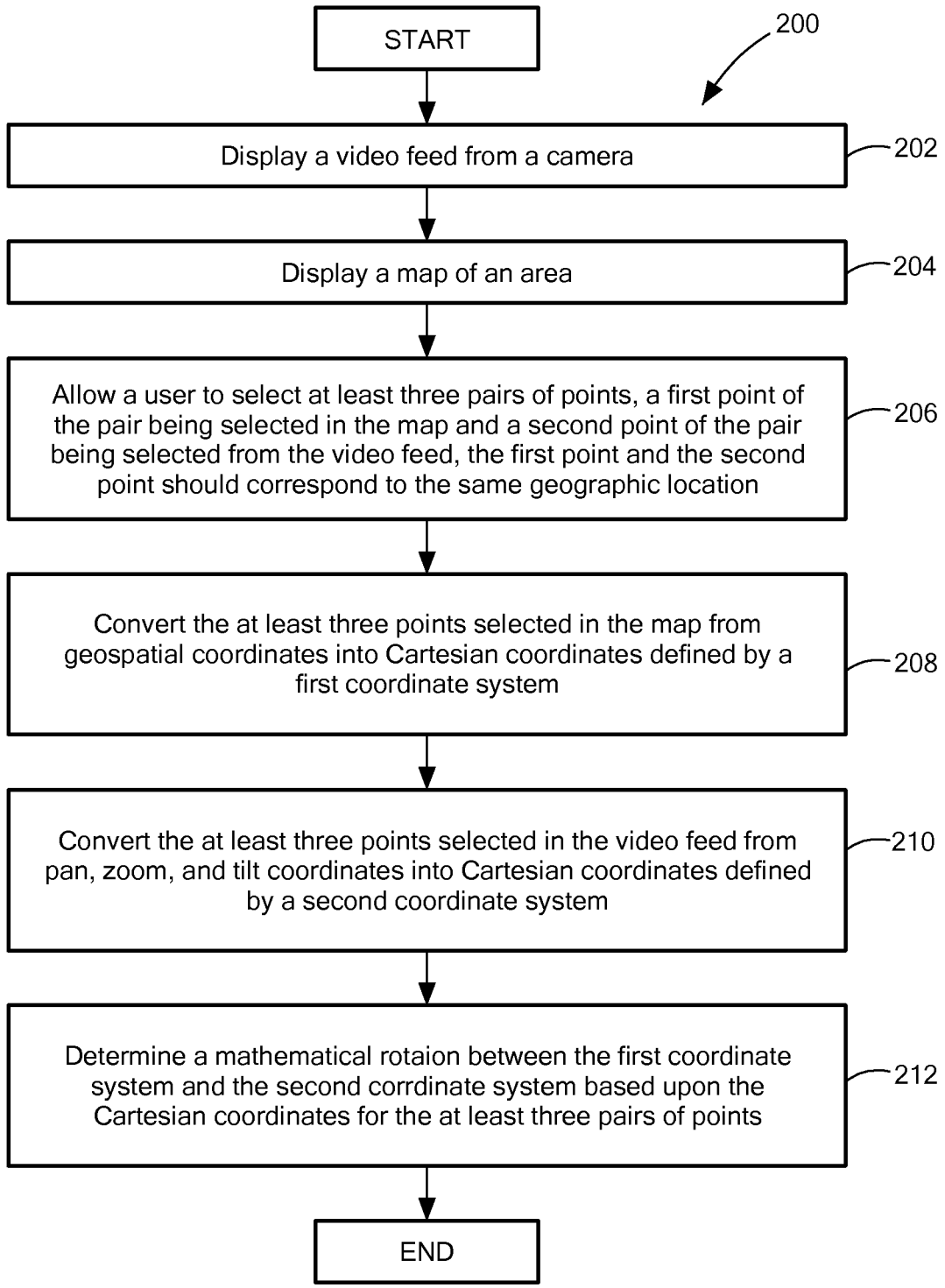
FIG. 2 shows a method for calibrating a surveillance system in accordance with one embodiment of the present invention.
Figure 3A:
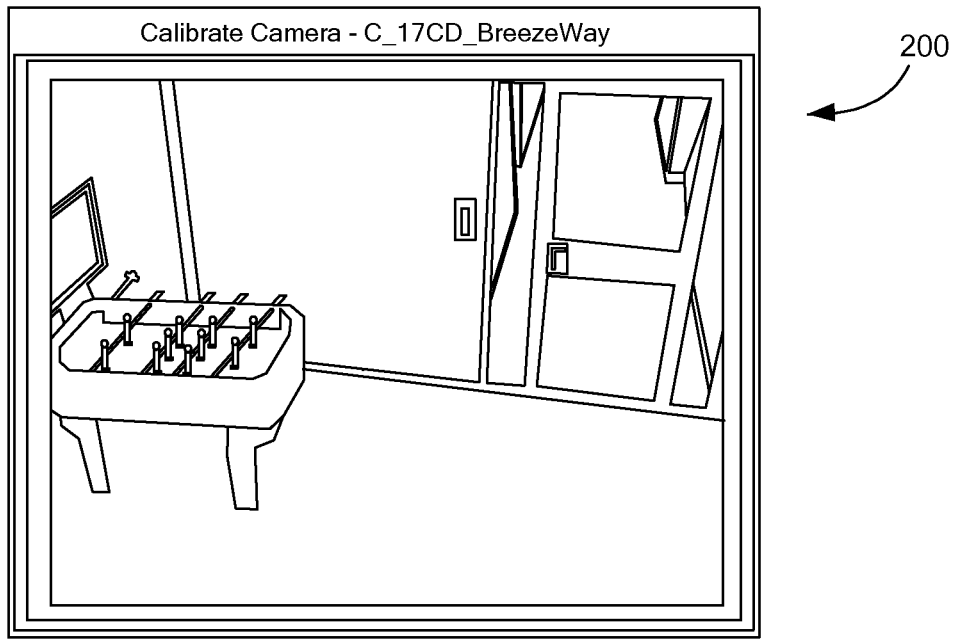
FIG. 3A shows a video feed from a camera in accordance with one embodiment of the present invention.

Illustrative embodiments of the present invention are directed to a method for calibrating a surveillance system (such as the one shown in FIG. 1.). FIG. 2 shows a method 200 for calibrating a surveillance system in accordance with one embodiment of the present invention. The method includes displaying a video feed from a camera using a display device 202. FIG. 3A shows a video feed 301 from a camera in accordance with one embodiment of the present invention. In the present example, the video feed 301 shows the breeze way of a building. In illustrative embodiments, the camera is a PTZ camera with an orientation that characterized by pan, zoom, and tilt coordinates, however, the use of other cameras is also within the scope of the present invention.

Figure 3B:
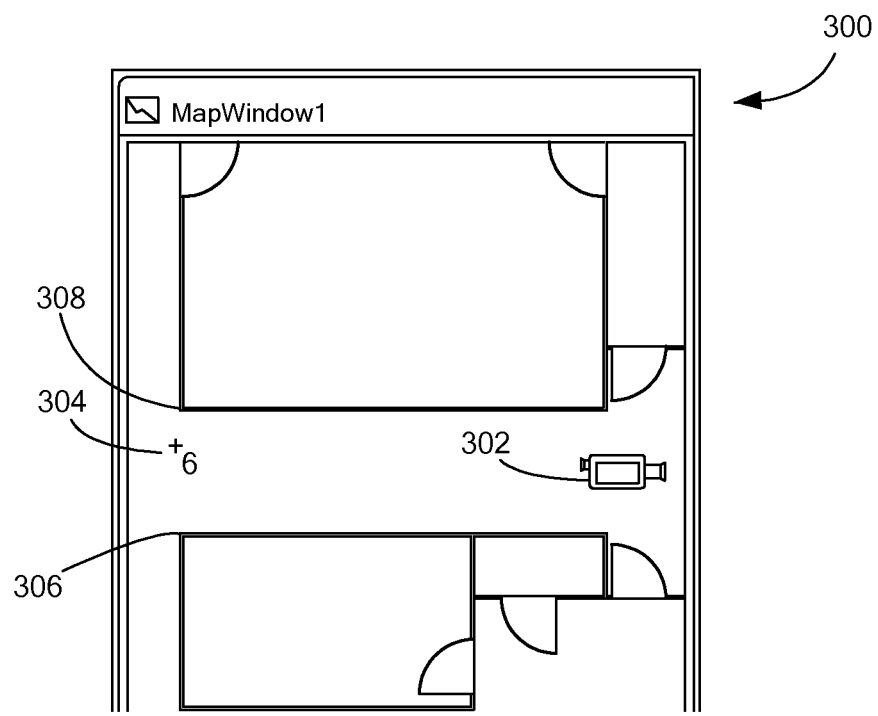
FIG. 3B shows a map of a building floor plan in accordance with one embodiment of the present invention.

The method also includes using the display device to display a map of an area 204. FIG. 3B shows a map 300 of a building floor plan in accordance with one embodiment of the present invention. The floor plan includes a hallway that is located between two rooms. The map 300 is characterized by geospatial coordinates. In other words, each point on the map 300 can be defined in terms of a geospatial coordinates such as latitude and longitude. In some embodiments of the present invention, the map 300 does not include a coordinate for altitude. In such an embodiment, the altitude is assumed to be "0". In other illustrative embodiment of the present invention, every point on the map 300 is defined by an altitude coordinate and, therefore, every point on the map is defined by three coordinates: latitude, longitude, and altitude. In yet another embodiment of the invention, only some of the points on the map 300 are defined in terms of altitude. In such an embodiment, the altitude for points that are not defined can be extrapolated from adjacent points that do have defined altitudes. For example, if a first point at 30.000 degrees latitude and 20.000 degrees longitude does not have a defined altitude, then points closest to the first point can be used to extrapolate the altitude for the first point. In such an example, the method uses a second point, at 30.000 degrees latitude and 19.999 degrees longitude with an altitude of 4 feet, and a third point, at 30.000 degrees latitude and 20.001 degrees longitude with an altitude of 10 feet, to assume that the altitude for the first point is about 7 feet. In illustrative embodiments, various other extrapolation techniques can also be used. For example, in some embodiments, algorithms for smoothing the extrapolated altitudes may be used.

Illustrative embodiments of the map 300 also show the location of a camera on the map using a camera icon 302. In this manner, a user can view the map 300 and understand the vantage point and perspective of the video feed from the camera. In FIG. 3B, a camera icon 302 shows the location of the camera at the end of the hallway.

The map 300 also displays an input device 304 so that the user can select points on the map 300. In FIG. 3B, the input device 304 is a crosshair, however, in other embodiments the input device can take the form of, for example, an arrow, a touch screen, and/or a menu.

Figure 4A:
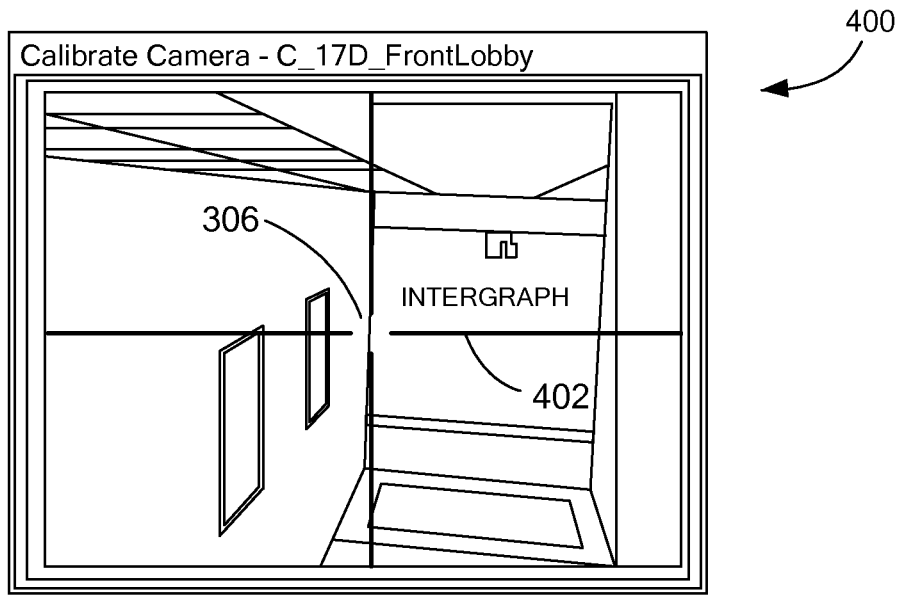
FIG. 4A shows a video feed from a camera in accordance with one embodiment of the present invention.

Illustrative embodiments of the calibration method allow the user to select at least three pairs of points using the input device 304, 206. A first point of the pair is selected in the map 300 using the input device 304. In FIG. 3B, the user selects a left corner 306 in the hallway using the crosshair 304. The processor registers the particular geospatial coordinates for the selected point. Once the user selects the first point in the map 300, he then selects the second point of the pair from a video feed. FIG. 4A shows a video feed 400 in accordance with one embodiment of the present invention. The video feed 400 and the map 300 may be simultaneously displayed in separate windows on one display device or each separately on its own display device. In FIG. 4A, the user uses a crosshair 402 to select the left corner 306 in the hallway in the video feed 400. When the user selects a point in the video feed 400, a processor queries the camera for its orientation (e.g., pan angle, tilt angle, and zoom). Once the orientation is received from the camera, the processor registers the particular orientation of the camera. The first and second points in the pair should be selected so that they correspond to the same geographic location. In this manner, the method appropriately calibrates the video feed 400 to the map 300.

Figure 4B:
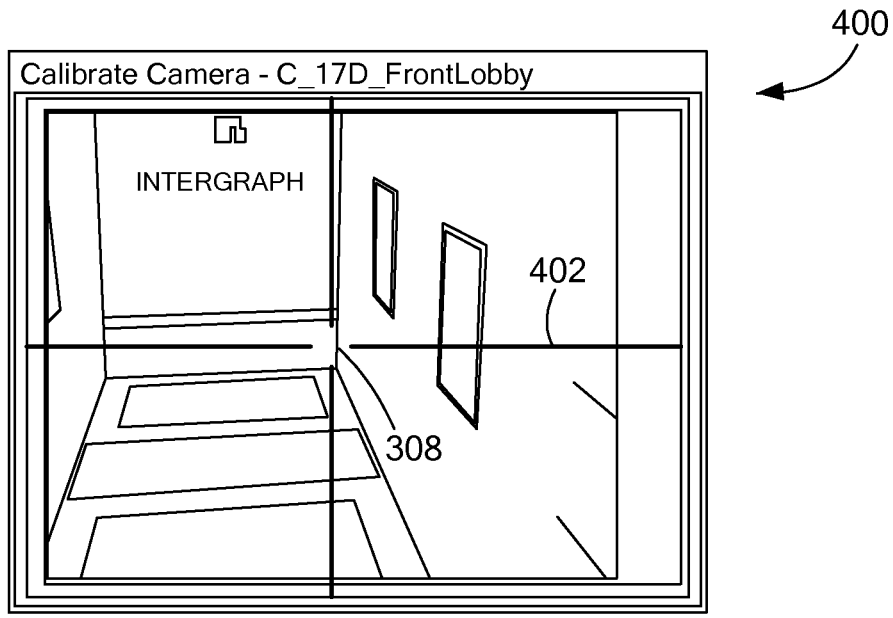
FIG. 4B shows a video feed from a camera in accordance with one embodiment of the present invention.

Once the first pair of points is selected, the user selects a second pair of points. In FIG. 3B, the user selects a first point of the pair as a right corner 306 in the hallway. The second point of the pair is then selected in the video feed 400. FIG. 4B shows the video feed 400 in accordance with one embodiment of the present invention. In FIG. 4B, the user has shifted the orientation of the camera and, therefore, the video feed 400 displays a different part of the hallway. The user uses the crosshair 402 to select the right corner 308 of the hallway as it appears in the video feed 400.

Once the second pair of points is selected, the user selects a third pair of points. In illustrative embodiments of the present invention, the user selects three pairs of points, however, in other exemplary embodiments, the user may selects 4, 5, or more pairs of points for the calibration. In some exemplary embodiments, using more pairs of points results in a more accurate calibration because any error within the coordinates of one point is averaged over a greater number of points.

In illustrative embodiments of the present invention, as described above, the user selects the first point of the pair in the map 300 and then the second point of the pair in the video feed 400. Once the first pair of points is selected, the user then selects the next pair of points. The embodiments of the present invention, however, are not limited to this particular order. In fact, the points can be selected in any order so long as there are at least three pairs of points selected. For example, in one illustrative embodiment, the user first selects a point of the pair in the video feed 400 and then selects the other point of the pair in the map 300. In yet another illustrative embodiment, the user first selects all three points in the video feed 400 and then selects corresponding points in the map 300.

Figure 5:
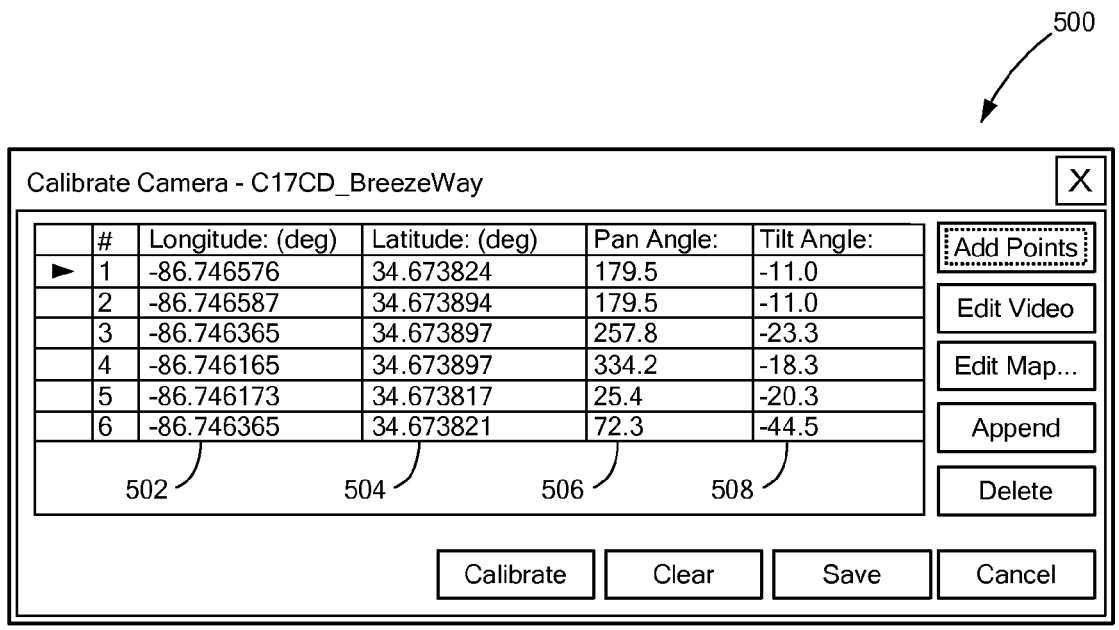
FIG. 5 shows a table of selected points in accordance with one embodiment of the present invention.

FIG. 5 shows a table 500 of selected points in accordance with one embodiment of the present invention. The table includes 6 pairs of points and lists the particular coordinates for each of the pairs. Columns 502 and 504 list the geospatial coordinates for the points selected in the map 301. Columns 506 and 508 list the camera orientations for the points selected in the video feed 400. The geospatial coordinates in the table 500 are latitude, longitude, and altitude (altitude not displayed), while the coordinates for the camera coordinates are pan angle, tilt angle, and zoom (zoom not displayed).

In various embodiments of the calibration method, the pan, tilt, and zoom orientation of the camera for each point in the video feed are converted into effective pan and tilt angles for the points themselves. The processor initially registers the orientation of the camera itself, but these initial pan and tilt angles are representative of the center of the video feed. When a user selects points away from the center of the video feed 400, the effective pan and tilt angles for the points will be different from the pan and tilt orientation of the camera itself. To determine the effective pan and tilt angles for the points, a horizontal angular field of view ($H_{FOV}$) and vertical angular field of view ($V_{FOV}$) is determined using Equations 1 and 2:

$$H_{FOV} = \text{Zoom} \quad (1)$$

$$V_{FOV} = \text{Zoom} \times \frac{1}{AspectRatio} \quad (2)$$

The effective pan angle ($\theta$) can be calculated using Equation 3, $$\theta = H_{FOV} \times \frac{H_D}{W_{Videofeed}} + \text{Pan} \quad (3)$$

wherein $H_D$ is the horizontal distance (e.g., in pixels) from the center of the video feed 400 to the point, and $W_{Videofeed}$ is the width of the video feed (e.g., in pixels). Also, the effective tilt angle ($\phi$) can be calculated using Equation 4, $$\varphi = V_{FOV} \times \frac{V_D}{H_{Videofeed}} + \text{Tilt} \quad (4)$$

wherein $V_D$ is the vertical distance (e.g., in pixels) from the center of the video feed 400 to the point, and $H_{Videofeed}$ is the height of the video feed (e.g., in pixels).

Illustrative embodiments of the calibration method also include converting the at least three points selected in the video feed 400 from effective pan and tilt angles to Cartesian coordinates defined by a Cartesian coordinate system 210. In various embodiments of the calibration method, the effective pan and tilt angles are converted to unit vectors on a "camera" Cartesian coordinate system that has its origin at the camera's location. The effective pan and tilt angles can be converted into Cartesian coordinates using Equations 5, 6, and 7:

$$u = \cos(\phi) \times \sin(\theta) \quad (5)$$

$$v = \cos(\phi) \times \cos(\theta) \quad (6)$$

$$w = \sin(\phi) \quad (7)$$

In this manner, Cartesian coordinates are calculated for the effective pan ($\theta$) and tilt ($\phi$) angles of each point selected in the video feed 400.

Illustrative embodiments of the calibration method further include converting the three points selected in the map 300 from geospatial coordinates into Cartesian coordinates defined by a coordinate system 208. The coordinate system can be created using a geospatial location for a point ($P_{lat}$, $P_{lon}$, $P_{alt}$) and a geospatial location for the camera ($C_{lat}$, $C_{lon}$, $C_{alt}$). The origin of the "map" Cartesian coordinate system is set as the location of the camera. In illustrative embodiments, the x-axis of the coordinate system points east, the y-axis points north, and the z-axis points in a direction away from and normal to the Earth.

The distance from the camera to the point along the x-axis can be calculated using Equation 8:

$$X_P = R_E \times \sin(P_{lat} - C_{lat}) + (R_E \times \cos(P_{lat})) \times (1 - \cos(P_{lon} \times C_{lon})) \times \sin(C_{lat}) \quad (8)$$

The distance from the camera to the point along the y-axis can be calculated using Equation 9:

$$Y_P = R_E \times \cos(P_{lat}) \times \sin(P_{lon} - C_{lon}) \quad (9)$$

The distance from the camera to the point along the z-axis can be calculated using Equation 10:

$$Z_P = -C_{alt} = -P_{alt} \quad (10)$$

In each of Equations 8, 9, and 10, $R_E$ is the semi-major axis of the earth, which can be calculated according to Equation 11, $$R_E = (1 - K_{flat}) \times \sin^2(P_{lat}) \times R_a \quad (11)$$

wherein $K_{flat}$ is the Earth flatness constant, which is approximately 1/298.257, and $R_a$ is the radius of the Earth, which is approximately 6,378,137 meters. Accordingly, using Equations 8, 9, and 10, the Cartesian coordinates for the point are ($X_P$, $Y_P$, $Z_P$) and the Cartesian coordinates for the camera are (0, 0, 0).

In illustrative embodiments, the three points selected from the video feed are then converted into unit vectors. The unit vectors can be determined using Equations 12, 13, and 14:

$$u = X_P / \sqrt{X_P^2 Y_P^2 Z_P^2} \quad (12)$$

$$v = Y_P / \sqrt{X_P^2 Y_P^2 Z_P^2} \quad (13)$$

$$w = Z_P / \sqrt{X_P^2 Y_P^2 Z_P^2} \quad (14)$$

Accordingly, each of the three points selected from the map is defined as a unit vector (u, v, w) of the "map" Cartesian coordinate system.

In the illustrative embodiments discussed above, the map 300 is characterized by geospatial coordinates such as latitude, longitude, and altitude. In other embodiments, however, the map is already characterized by a Cartesian coordinate system (before the above described calibration process) and, therefore, a conversion from geospatial coordinates to a Cartesian coordinate system may not be necessary.

Illustrative embodiments of the present invention further include determining a mathematical rotation between the "map" coordinate system and the "camera" coordinate system based upon the Cartesian coordinates for the at least three pairs of points selected from the map and the video feed 212. The mathematical rotation provides a conversion from points in the "map" coordinate system to corresponding points in the "camera" coordinate system. The transform of the rotation provides a conversion from points in the "camera" coordinate system to corresponding points in the "map" coordinate system. Or vice versa, a transform of the mathematical rotation provides a conversion from points in the "camera" coordinate system to corresponding points in the "map" coordinate system, and its transform provides a conversion from points in the "map" coordinate system to corresponding points in the "camera" coordinate system. As used in the present application, the term "rotation" also includes a transform of the rotation.

It is known in the art how to develop a mathematical rotation (and its transform) between a first Cartesian coordinate system and a second Cartesian Coordinate system. For example, in various embodiments, the mathematical rotation is a four-by-four matrix that is applied to unit vectors that define a point in one of the "camera" and "map" coordinate systems. The four-by-four rotation is determined by developing an initial four-by-four matrix. The initial four-by-four matrix is developed according to, for example, Section 4 of Berthold K. P. Horn, "Closed-form Solution of Absolute Orientation Using Unit Quaternions" 4 Journal of the Optical Society of America 629 (April 1987). The Horn article is hereby incorporated by reference in its entirety. Eigenvectors for the initial four-by-four matrix are then calculated using a Jacobi Eigenvalue algorithm as known in the art. The calculation of the Eigenvalues can be software coded as disclosed in, for example, Section 11.1 of William H. Press et al., "Numerical Recipes in C" (Cambridge University Press 2d ed.) (1992). Section 11.1 of that book is also hereby incorporated by reference. Once the eigenvectors are calculated, an eigenvector corresponding to the most positive eigenvalue is selected as the rotation matrix. In illustrative embodiments, the rotation matrix is stored by the processor as a quaternion.

Illustrative embodiments of the present invention are advantageous over many prior art systems because there is no need for the camera to be accurately aligned with other reference points. For example, many prior art systems require pan-zoom-tilt cameras to be level with the ground when installed and/or to be properly aligned with a particular coordinate system. If not properly aligned, the camera will not accurately shift and capture points of interest. The inventors have overcome this problem by calibrating the camera using a mathematical rotation between a first Cartesian coordinate system and a second Cartesian coordinate system. In illustrative embodiments of the present invention, the inventors discovered that the above disclosed calibration accounts for any misalignment of the camera with the ground or coordinate system. In the past, calibration of a camera with a map of an area was not approached as a problem that could be solved through the use of a mathematical rotation between two Cartesian coordinate systems, perhaps, because latitude-longitude coordinates and the motion of a pan-zoom-tilt camera does not correspond with a Cartesian coordinate system.

Camera Control Using the Map

Figure 6:
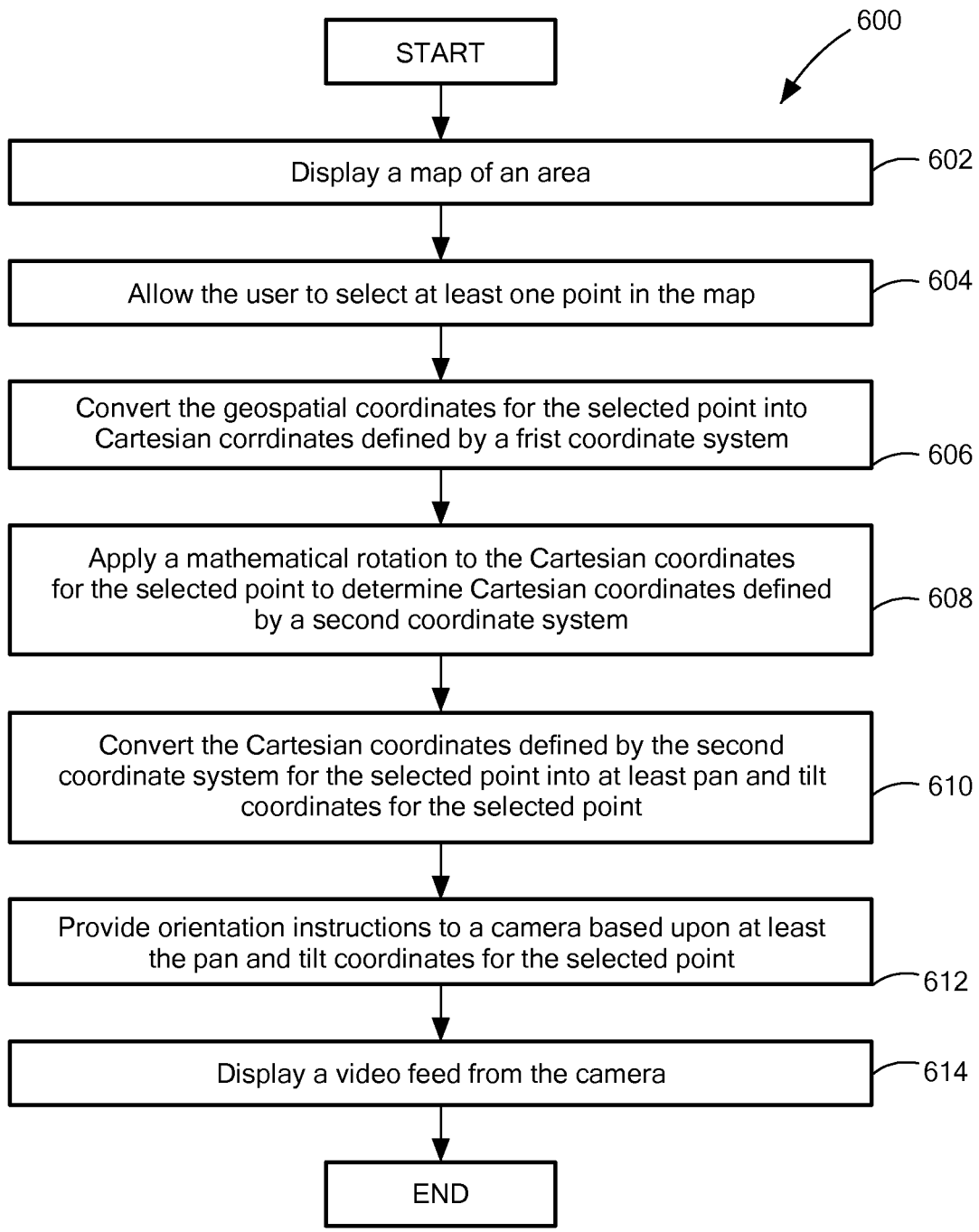
FIG. 6 shows a method for controlling at least one camera in accordance with one embodiment of the present invention.
Figure 7:
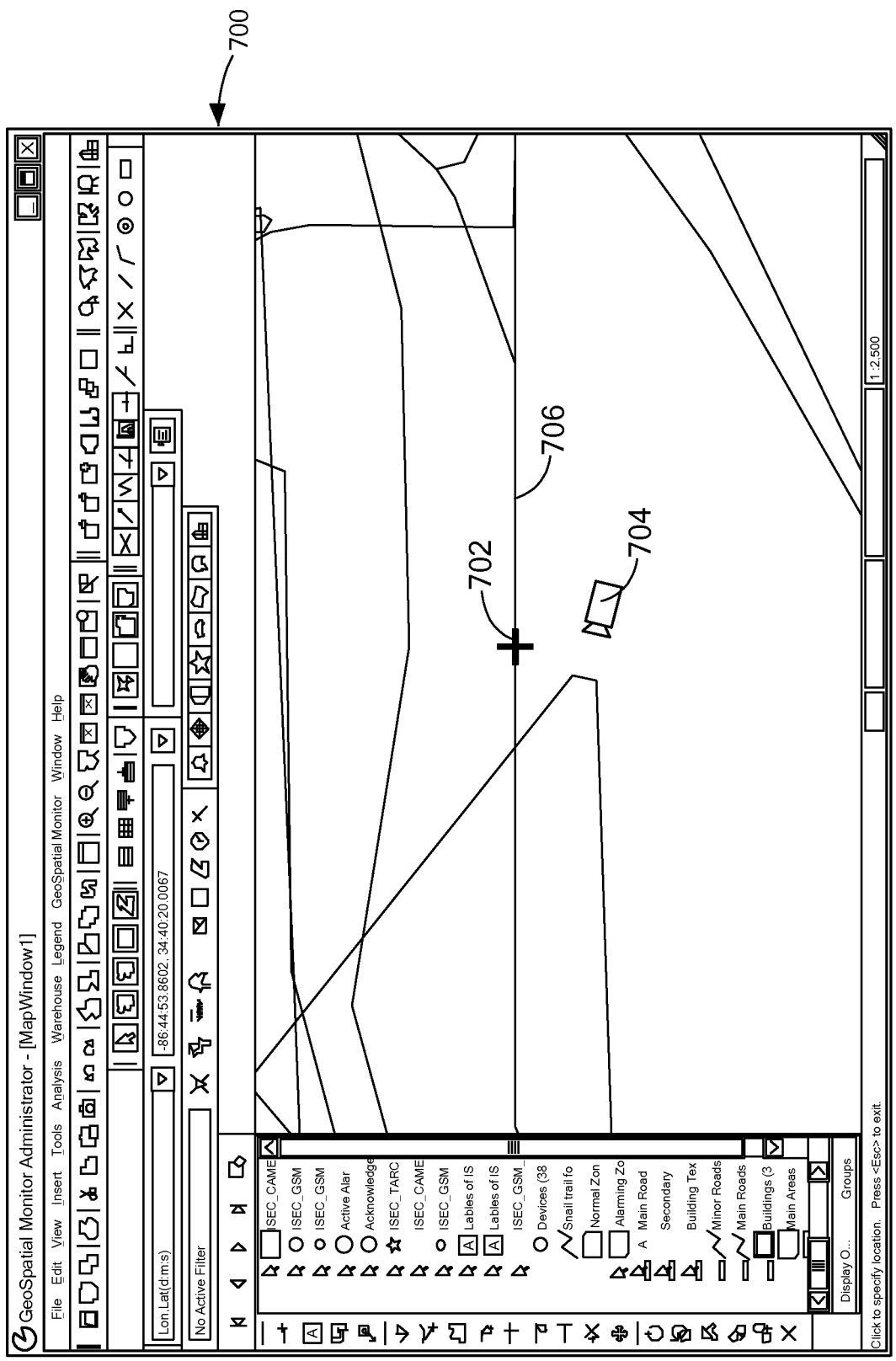
FIG. 7 shows a map of an outdoor terrain in accordance with one embodiment of the present invention.

Illustrative embodiments of the present invention are also directed to a computer-implemented method for controlling a camera in a surveillance system (such as the system shown in FIG. 1). FIG. 6 shows a method 600 for controlling at least one camera in accordance with one embodiment of the present invention. The method includes displaying a map of an area using a display device 602. FIG. 7 shows a map 700 of an outdoor terrain in accordance with one embodiment of the present invention. The map 700 is characterized by geospatial coordinates such as latitude, longitude, and altitude. The method further includes allowing a user to select a point of interest in the map 700 using an input device 604. In the embodiment of FIG. 6, the input device is a crosshair 702. In illustrative embodiments of the present invention, the orientation of a camera 704 then shifts so that the camera observes the point of interest. In this manner, the user controls the camera 704 and its orientation by simply selecting a point in the map 700 using the crosshair 702. Thus, the user can use a geospatial interface to automate camera control. In the example of FIG. 7, the user is interested in activity on a road 706 that runs through the map 700. By selecting a point on the road 706 in the map 700, the camera 704 automatically shifts its orientation to the road and the user can view the activity on the road via the video feed from the camera.

In illustrative embodiments, once the user selects the point on the map, a processor converts the geospatial coordinates for the selected point into Cartesian coordinates defined by a coordinate system 606. In exemplary embodiments, the conversion is performed using Equations 8, 9, 10, 11, 12, 13, and 14, as described in the "Calibration" section of present application. Accordingly, the geospatial coordinates for the point are defined as unit vectors of a "map" Cartesian coordinate system. The processor 108 then applies a mathematical rotation to the "map" Cartesian coordinates for the selected point to determine Cartesian coordinates defined by a "camera" Cartesian coordinate system 608. The "camera" coordinate system characterizes a video feed from the camera and a mathematical rotation (or its transform) provides a conversion between the "map" coordinate system and the "camera" coordinate system. In illustrative embodiments, the mathematical rotation is developed according to the method described in the "Calibration" section of the present application.

The Cartesian coordinates for the selected point (e.g., unit vectors u, v, w) are then defined in terms of pan, zoom, and tilt coordinates (e.g., pan (θ) and tilt (φ)) 610. The Cartesian coordinates (defined by the "camera" coordinate system) can be converted to pan and tilt angles using Equations 15 and 16:

$$\theta = \operatorname{atan}^2(u, v) \quad (15)$$

$$\varphi = \operatorname{atan}\left(\frac{w}{\sqrt{u^2 + v^2}}\right) \quad (16)$$

Accordingly, the selected point is defined in terms of a pan and tilt angles of the camera. Based on these pan and tilt angles, the processor can provide orientation instructions to the camera so that the camera shifts to view the selected point and the video feed of the selected point is thus displayed to the user 612, 614.

Target Tracking

Figure 8:
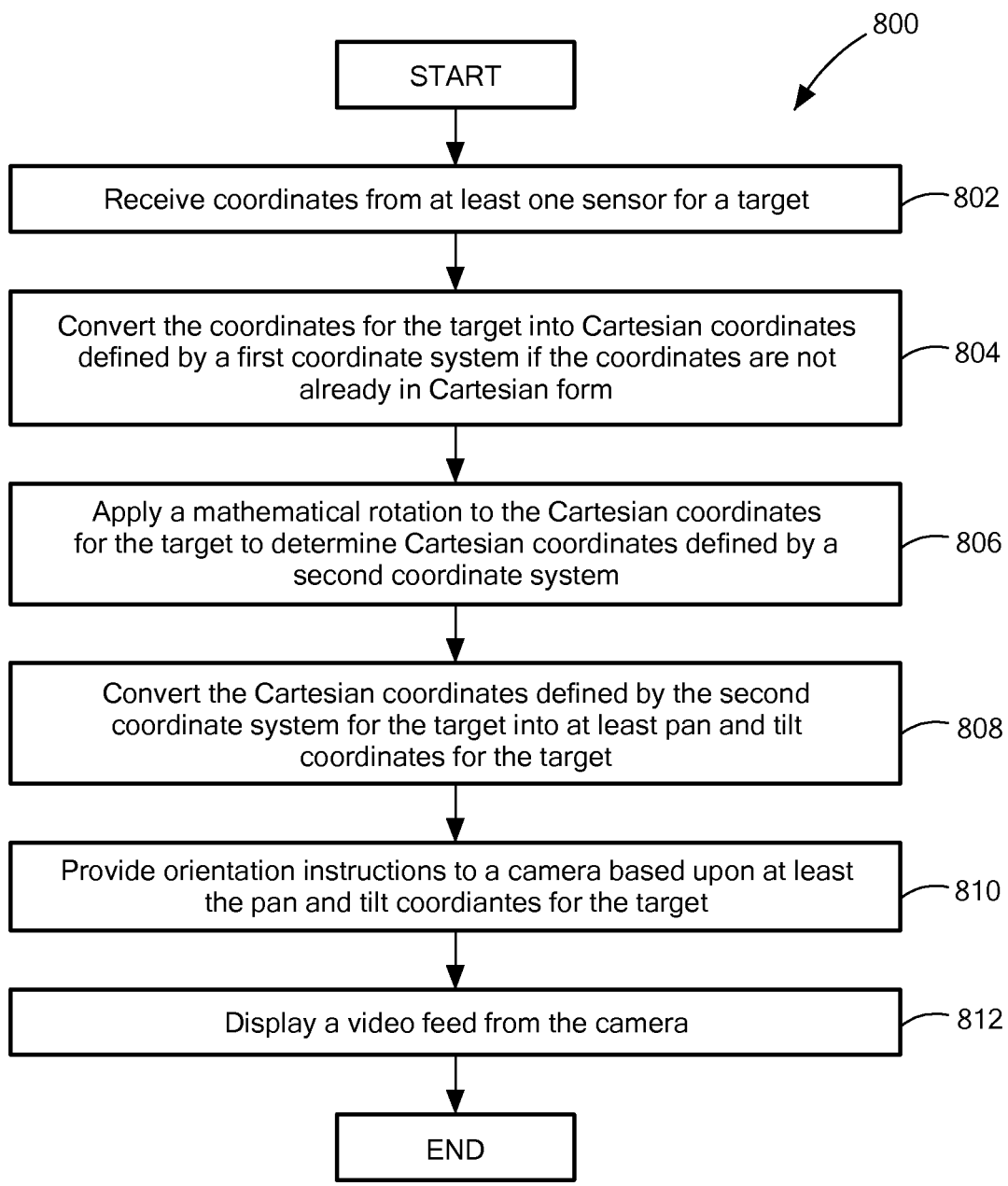
FIG. 8 shows a method for tracking a target in accordance with one embodiment of the present invention.

Illustrative embodiments of the present invention are also directed to a computer-implemented method for tracking a target using at least one camera and at least one sensor (e.g., such as those shown in FIG. 1). FIG. 8 shows a method 800 for tracking a target in accordance with one embodiment of the present invention. The method includes receiving coordinates for the target at a processor from the sensor 802. In some embodiments, the coordinates for the target that are received from the sensor and the coordinates are already defined in terms of a Cartesian coordinate system that characterizes a map of an area. For example, in some embodiments, the Cartesian coordinates for a motion detector in the map are determined when the detector is placed in the area. Therefore, if the motion detector is set-off, then the processor can assume that the target is located near the coordinates of the motion detector and uses the coordinates of the sensor defined by the "map" coordinate system to determine an appropriate camera action. In other embodiments, however, the coordinates for the target that are received from the sensor are defined in terms of a geospatial coordinate system. In such an embodiment, the geospatial coordinates are converted into Cartesian coordinates defined by the "map" coordinate system 804. In exemplary embodiments, the conversion is performed using Equations 8, 9, 10, 11, 12, 13, and 14, as described in the "Calibration" section of present application. In this manner, the geospatial coordinates for the target are defined as unit vectors (u, v, w) of the "map" Cartesian coordinate system.

The method for target tracking also includes applying a mathematical rotation (or its transform) to the "map" Cartesian coordinates for the target to determine Cartesian coordinates defined by a "camera" Cartesian coordinate system 806. The "camera" coordinate system defines a video feed from the camera and the mathematical rotation provides a conversion between the "map" coordinate system and the "camera" coordinate system. In illustrative embodiments, the mathematical rotation is developed according to the method described in the "Calibration" section of the present application.

The Cartesian coordinates for the target (u, v, w) are then defined in terms of pan, zoom, and tilt coordinates (e.g., pan "θ" and tilt "φ") for the camera 808. In various illustrative embodiments, the Cartesian coordinates are converted to pan and tilt angles using Equations 15 and 16, as described in the "Camera Control Using the Map" section of present application. Accordingly, the target is defined in terms of a pan and tilt angles of the camera. Based on these pan and tilt angles, the processor provides orientation instructions to the camera so that the camera shifts to view the target 810, 812.

In illustrative embodiments, the processor continuously receives coordinates from the sensor and iteratively determines camera instructions based upon the new coordinates. In this manner, the processor and the camera automatically track the target as it moves through the area.

Illustrative embodiments of the target tracking method may also display a map that shows the location of the sensor using a sensor icon. Furthermore, in additional or alternative embodiments, the map displays the location of the target in the area using a target icon. The processor can use the geospatial and/or "camera" Cartesian coordinates for the sensor and/or target to display them on the map. By displaying the target, sensor, and cameras on the map, the user can better understand the location of the target in relation to the sensors and cameras.

Prioritization of Cameras

Figure 9:
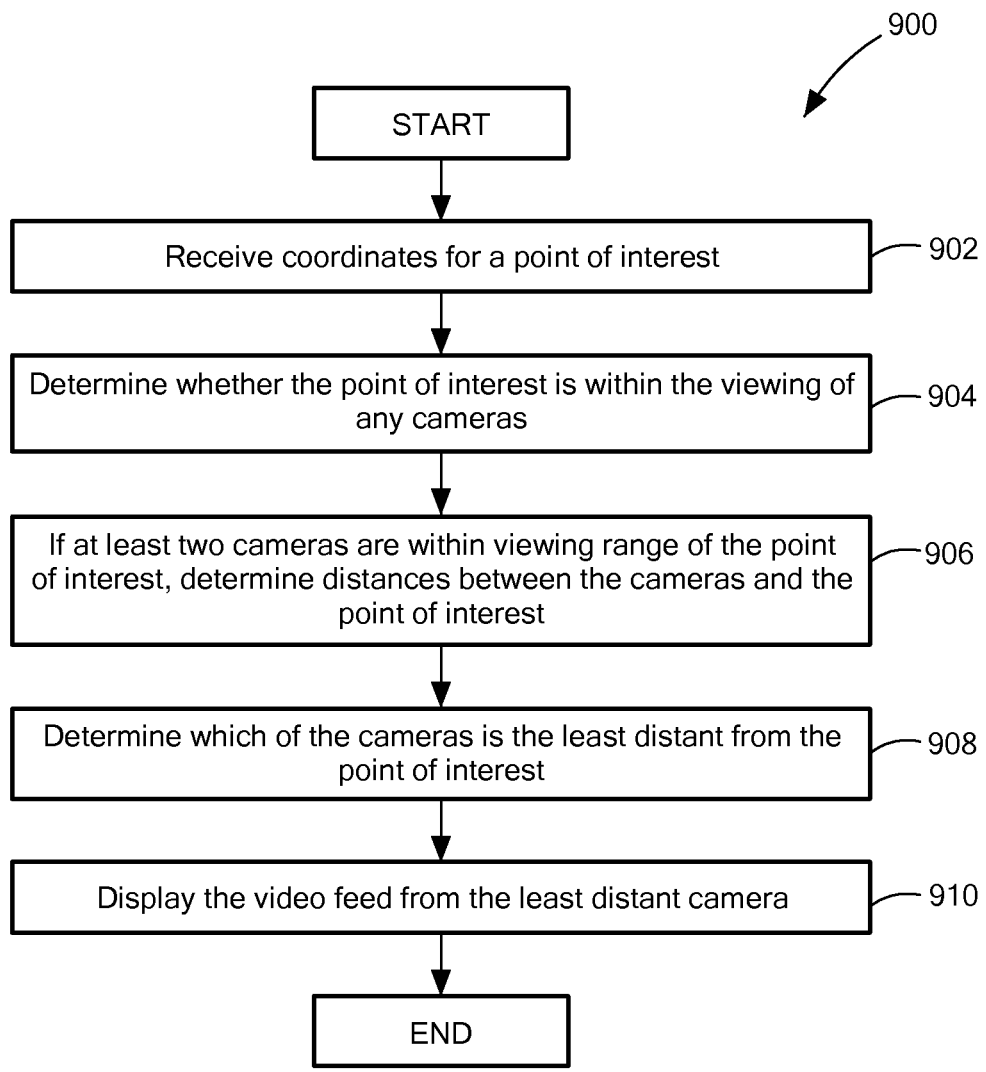
FIG. 9 shows a method for prioritizing video feeds from a plurality of cameras in accordance with one embodiment of the present invention.
Figure 10:
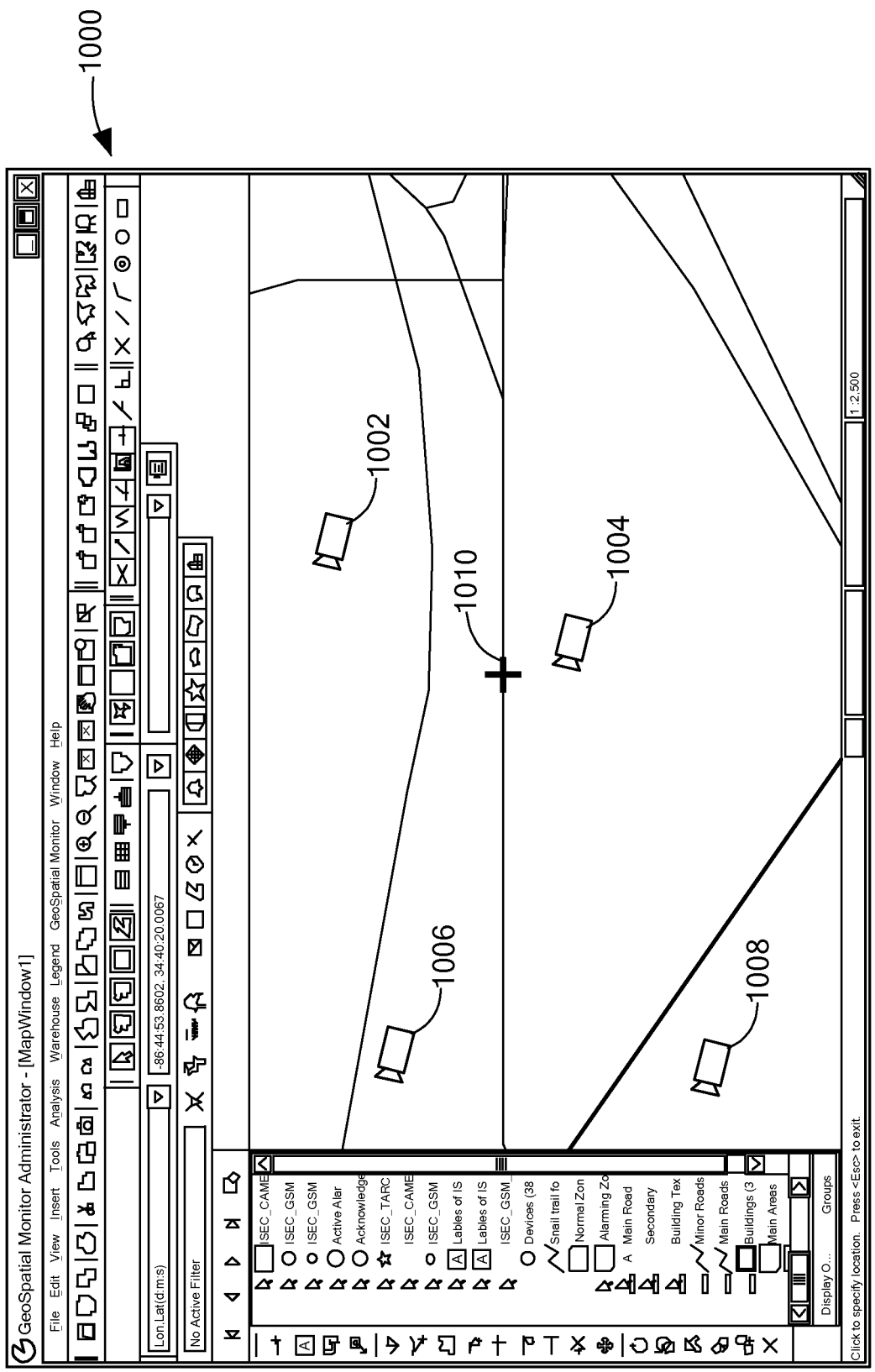
FIG. 10 shows a map of an outdoor terrain with a plurality of cameras in accordance with one embodiment of the present invention.

Illustrative embodiments of the present invention are also directed to a computer-implemented method for prioritizing video feeds from a plurality of cameras (such as the ones shown in FIG. 1). FIG. 9 shows a method 900 for prioritizing video feeds from a plurality of cameras in accordance with one embodiment of the present invention, while FIG. 10 shows a map 1000 of an outdoor terrain including a plurality of cameras 1002, 1004, 1006, 1008 in accordance with another embodiment of the present invention.

Illustrative embodiments of the method include receiving geospatial coordinates for a point of interest 1010, 902. In the embodiment shown in FIG. 10, the point of interest 1002 is also selected by a user from the map 1000 using a display device and an input device. In other illustrative embodiments, the coordinates for the point of interest are representative of a target and the coordinates are received from a sensor. Once the coordinates for the point of interest are received, in various embodiments, one or more cameras 1002, 1004, 1006, 1008 shift their orientation to capture the point of interest 1010. In illustrative embodiments of the present invention, the cameras 1002, 1004, 1006, 1008 are assigned a prioritization based upon their distance from the point of interest 1010.

Various exemplary embodiments of the prioritization method include determining whether the point of interest 1010 is within the viewing range of any of the cameras 1002, 1004, 1006, 1008, 904. In some exemplary embodiments, the method also includes determining which cameras 1002, 1004, 1006, 1008 are available for viewing the point of interest (e.g., some cameras may be tracking a different target or the user may not have permission to use certain cameras).

Figure 11:
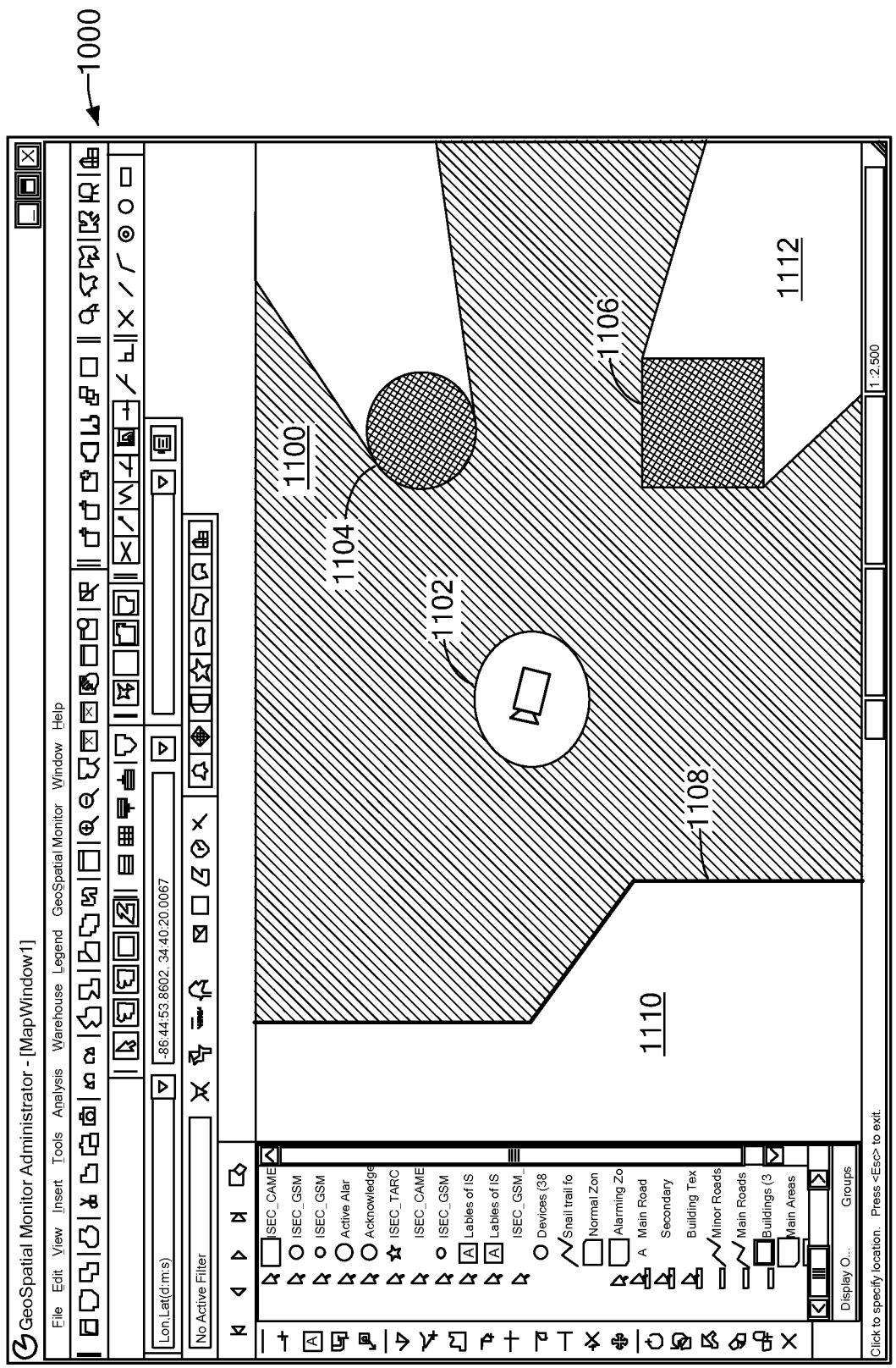
FIG. 11 shows a viewing range of a camera in accordance with one embodiment of the present invention.

FIG. 11 shows a viewing range 1100 of a camera 1102 in accordance with one embodiment of the present invention. As shown in FIG. 11, the viewing range 1100 of the camera 1102 can also be defined to account for obstacles 1104, 1106, 1108. For example, in FIG. 11, the viewing range 1100 of the camera 1102 is blocked by a wall 1108 and, accordingly, the area 1110 that appears behind the wall is omitted from the viewing range. Similarly, a house 1106 is also in the way of the viewing range 1100 and thus the area 1112 behind the house is also omitted from the viewing range.

In various exemplary embodiments, the viewing range for each camera is defined by the user. To this end, in illustrative embodiments, the user can use an input device to outline the viewing range 1100 for the camera 1102 within a displayed map, as shown in FIG. 11. In illustrative embodiments, the user can outline the viewing range of the camera by generating a plurality of line segments having starting points and end points. The user then closes the line segments to form a polygon that has vertices defined by the starting points and endpoints of the line segments. In this manner, the viewing range of the camera can be defined as relatively complex and irregular area, such as the viewing range 1100 shown in FIG. 11. In some cases, it may be appropriate to represent the viewing range of the camera using a plurality of polygons. In various exemplary embodiments, the vertices of the polygon are defined in terms of geospatial coordinates, however, in other embodiments, the vertices are defined in terms of a "map" Cartesian coordinate system or even a "camera" coordinate system.

In exemplary embodiments, to determine whether the point of interest 1010 is within the viewing range of any of the cameras 1002, 1004, 1006, 1008, the method determines whether the point of interest appears within the polygonal viewing range of each of the cameras. To this end, illustrative embodiments of the present invention use various point-in-polygon algorithms known in the art. In one example of such an algorithm, the method assumes a horizontal line starting at the point of interest and continuing across the map. If the assumed horizontal line intersects the line segments of the polygon an even number of times (e.g., 0, 2, 4), then the point of interest is outside the polygon. If the assumed line intersects the polygon an odd number of times (e.g., 1, 3, 5), then the point of interest is within the polygon. In another example, the sum of the angles made between the point of interest and each vertex (or point) making up the polygon are computed. If the sum is 360 degrees (e.g., $2\pi$), then the point of interest is interior to the polygon. If the sum is 0 degrees, then the point of interest is exterior to the polygon and, therefore, also exterior to the viewing range of the camera. Further details of point-in-polygon algorithms can be found in the reference: Paul Bourke, "Determining If a Point Lies on the Interior of a Polygon" (November 1987) (accessible at http://local-.wasp.uwa.edu.au/~pbourke/geometry/insidepoly/), which is hereby incorporated by reference in its entirety.

In one exemplary case, if only one camera has the viewing range to capture the point of interest, the processor provides orientation instructions to that camera to capture the point of interest. In another example, if there are at least two cameras with the viewing range to capture the point of interest, the processor determines the distances between the two cameras and the point of interest 906. If the camera locations and the point of interest are both defined in terms of a Cartesian coordinate system (e.g., the "map" Cartesian coordinate system an/or the "camera" Cartesian coordinate system discussed above), then the distance between the cameras and the point of interest can be calculated according to Equation 17, $$D = \sqrt{(X_C - X_P)^2 + (Y_C - Y_P)^2 + (Z_C - Z_P)^2} \quad (17)$$

wherein $(X_C, Y_C, Z_C)$ are the Cartesian coordinates for the camera and $(X_P, Y_P, Z_P)$ are the Cartesian coordinates for the point of interest. Equation 17 is particularly accurate for use with surveillance systems that do not need to account for the curvature of the earth (e.g., surveillance systems within buildings). If the camera locations and the point of interest are both defined in terms of a geospatial coordinate system (e.g., latitude, longitude, and altitude), then the Cartesian distance can be calculated using Equations 8, 9, 10, and 11 as described in the "Calibration" section of the present application. The distance can then be calculated using Equation 17 as described in this section. The benefit of using Equations 8, 9, 10, and 11 is that they account for the curvature of the Earth and, thus, provide better accuracy for surveillance systems that survey, for example, outdoor terrains. Further details of calculating distances between geospatial coordinates can be found in the reference: Ivan S. Ashcroft, "Projecting an Arbitrary Latitude and Longitude onto a Tangent Plane" Brigham Young University (Jan. 21, 1999), which is hereby incorporated by reference in its entirety.

Once the distances between the point of interest and the cameras are determined, the processor determines which of the cameras is the least distance from the point of interest 908. In illustrative embodiments of the present invention, the least distance camera is then provided with orientation instruction based upon the coordinates of the point of interest and the video feed from the least distance camera is displayed on a display device 910.

Illustrative embodiments of the present invention are particularly beneficial when a surveillance system includes a plurality of cameras but only has a limited bandwidth and/or a limited number of display devices to display video feeds. In this case, exemplary embodiments of the present invention allow the system to prioritize the cameras and display the video feed from the camera that is closest to the point of interest and has the best view of the point of interest.

Furthermore, illustrative embodiments of the present invention no longer rely on the user's manual control to capture a point of interest or a moving object. For example, if a target is walking in a field and suddenly hides behind a wall, then the target might not be within the viewing range of a camera located in front of the wall, but the target might still be within the viewing range of another camera located behind the wall. In some prior art systems, the user would need to manually toggle between the two cameras in order to capture the target behind the wall. Illustrative embodiments of the present invention, however, automatically prioritize and display video feeds based on the camera's range of view and distance from the target.

View Cone

Figure 12:
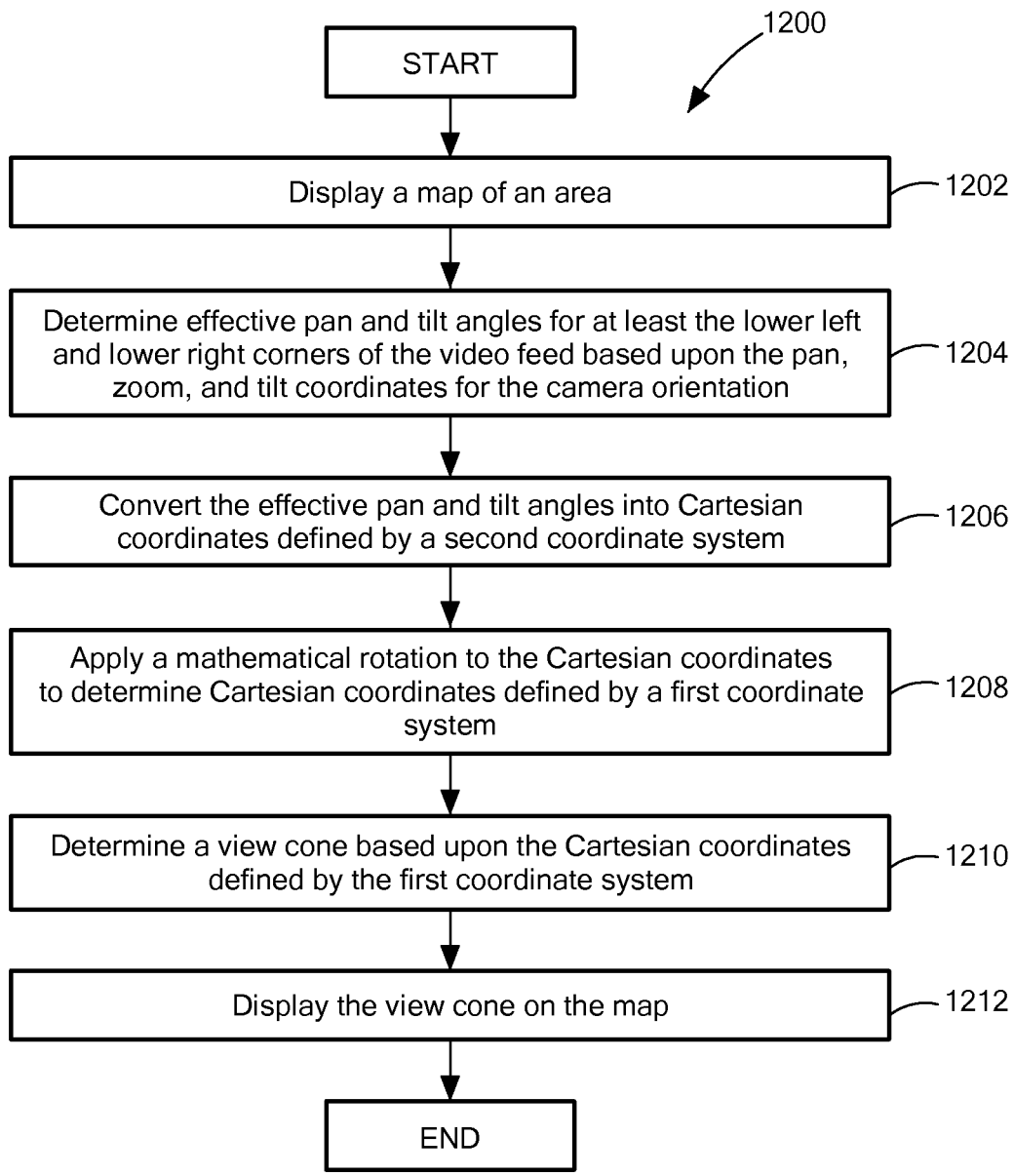
FIG. 12 shows a method for displaying a view cone for at least one camera in accordance with one embodiment of the present invention.
Figure 13:
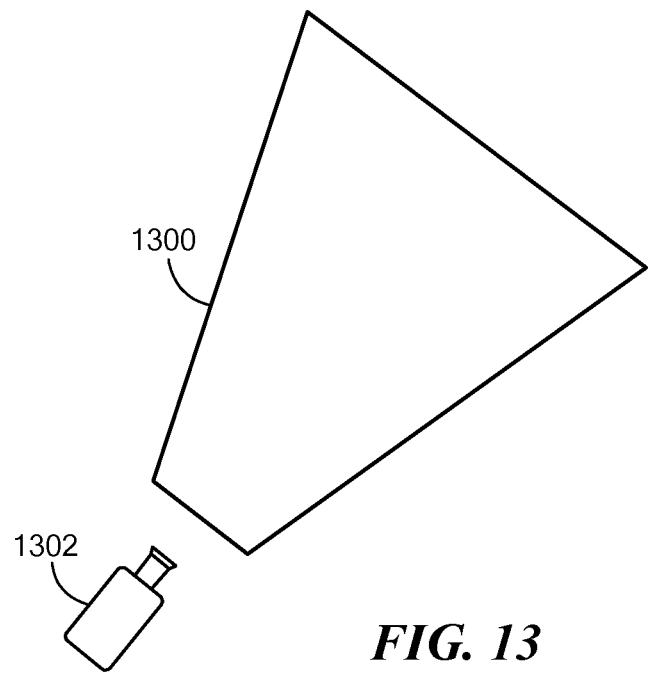
FIG. 13 shows a view cone and a camera icon in accordance with one embodiment of the present invention.
Figure 14:
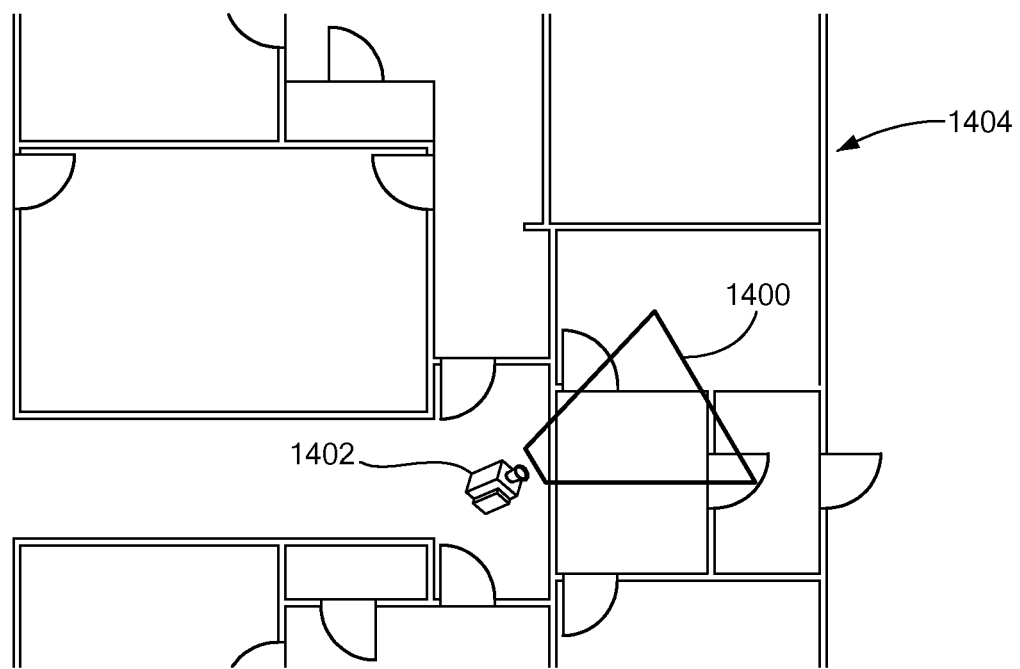
FIG. 14 shows a view cone and camera icon as applied to a map in accordance with one embodiment of the present invention.

Illustrative embodiments of the present invention are also directed to a computer-implemented method for displaying a view cone for a camera. FIG. 12 shows a method 1200 for displaying a view cone for at least one camera in accordance with one embodiment of the present invention. FIG. 13 shows a view cone 1300 and a camera icon 1302 in accordance with one embodiment of the present invention. In exemplary embodiments of the present invention, the view cone 1300 is representative of the field of view of the camera. Using the view cone 1300 is particularly advantageous when it is applied to a map because it helps the user understand the vantage point and perspective of the camera within an area. FIG. 14 shows a view cone 1400 and camera icon 1402 as applied to a map 1404 in accordance with one embodiment of the present invention 1202.

Figure 15:
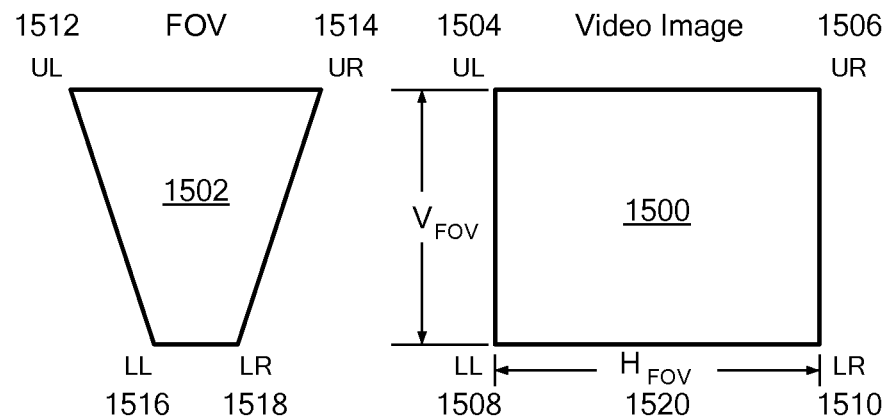
FIG. 15 shows a video feed and a corresponding view cone in accordance with one embodiment of the present invention.

In illustrative embodiments of the present invention, the view cone is created by transposing the effective coordinates of the upper left, upper right, lower left, and lower right corners of a video feed onto a map. FIG. 15 shows a video feed 1500 and field of view cone 1502 in accordance with another embodiment of the present invention. The video feed 1500 includes upper left 1504, upper right 1506, lower left 1508, and lower right corners 1510. The view cone 1502 also includes upper left 1512, upper right 1514, lower left 1516, and lower right vertices 1518. In illustrative embodiments of the present invention, the view cone 1502 is created by transposing the effective coordinates of the upper left 1504, upper right 1506, lower left 1508, and lower right corners 1510 of the video feed 1500 onto upper left 1512, upper right 1514, lower left 1516, and lower right vertices 1518 of the view cone 1502. The advantage of creating the view cone based upon the effective coordinates of the video feed is that, when the orientation of the camera shifts, the view cone 1502 on the map also changes to better represent the field of view of the camera.

In illustrative embodiments of the present invention, the effective coordinates of the upper left 1504, upper right 1506, lower left 1508, and lower right corners 1510 of the video feed 1500 are determined from the orientation of the camera (e.g., the pan, zoom, and tilt coordinates for the camera). For each of the upper left 1504, upper right 1506, lower left 1508, and lower right corners 1510 of the video feed 1500, effective pan and tilt angles are calculated 1204. To determine the effective pan and tilt angles for the points, a horizontal angular field of view ($H_{FOV}$) 1520 and vertical angular field of view ($V_{FOV}$) 1522 is determined using, for example, Equations 1 and 2, as described in the "Calibration" section of the present application. Next, the effective pan and tilt angles ($\theta$, $\phi$) for each of the corners 1504, 1506, 1508, and 1510 is determined using, for example, Equations 3 and 4 as described above in the "Calibration" section of the application.

In exemplary embodiments of the present invention, the effective pan and tilt angles ($\theta$, $\phi$) for the corners 1504, 1506, 1508, and 1510 are converted to Cartesian coordinates defined by a Cartesian coordinate system 1206. In various embodiments of the method, the effective pan and tilt angles are converted to unit vectors (u, v, w) on a "camera" Cartesian coordinate system that has its origin at the camera's location. The effective pan and tilt angles can be converted into Cartesian coordinates using Equations 5, 6, and 7, as described in the "Calibration" section of the present application.

To transpose the corners 1504, 1506, 1508, and 1510 of the video feed 1502 to corners 1512, 1514, 1516, and 1512 of the view cone 1500 on the map, a mathematical rotation (or its transform) is applied to the "camera" Cartesian coordinates for the corners 1504, 1506, 1508, and 1510, 1208. The mathematical rotation (or its transform) determines unit vectors (u, v, w) defined by a "map" Cartesian coordinate system. The "map" coordinate system defines the map and the mathematical rotation provides a conversion between the "camera" coordinate system and the "map" coordinate system. In illustrative embodiments, the mathematical rotation is developed according to the method described in the "Calibration" section of the present application. After the mathematical rotation, the unit vectors (u, v, w) are converted to scaled Cartesian coordinates using Equations 18, 19, and 20:

$$X_P = u \times \text{ScalingFactor} \tag{18}$$

$$Y_P = v \times \text{ScalingFactor} \tag{19}$$

$$Z_P = w \times \text{ScalingFactor} \tag{20}$$

In various embodiments of the present invention, the scaling factor can be determined using Equation 21, $$\text{ScalingFactor} = \left| \frac{C_{alt}}{w} \right| \tag{21}$$

wherein, in various embodiments, $C_{alt}$ is the altitude of the camera above the ground. In illustrative embodiments of the present invention, the scaled "map" Cartesian coordinates ($X_P$, $Y_P$, $Z_P$) for the corners 1504, 1506, 1508, and 1510 are used to determine the view cone 1500 and the view cone is then displayed on the map 1210, 1212. In more specific illustrative embodiments, as shown in FIG. 15, the view cone is a polygon and the "map" Cartesian coordinates for the corners 1504, 1506, 1508, and 1510 are used to define the vertices 1512, 1514, 1516, and 1512 of the view cone 1500.

In yet another embodiment of the present invention, the scaled "map" Cartesian coordinates ($X_P$, $Y_P$, $Z_P$) for the corners 1504, 1506, 1508, and 1510 are converted into geospatial coordinates ($P_{lat}$, $P_{lon}$, $P_{alt}$). In various exemplary embodiments, the "map" Cartesian coordinates ($X_P$, $Y_P$, $Z_P$) can be converted into geospatial coordinates ($P_{lat}$, $P_{lon}$, $P_{alt}$) by determining deltas for longitude and latitude using Equations 22 and 23, $$\Delta_{lat} = \arcsin \frac{X_P}{R_{lon}} \tag{22}$$

$$\Delta_{lon} = \arcsin \frac{Y_P - (1 - \cos(\Delta_{lat})) \times \sin(C_{lat}) \times R_{lon}}{R_E} \tag{23}$$

wherein $C_{lat}$ is the known latitudinal geospatial coordinate for the camera, $R_E$ can be calculated from Equation 11 above, and $R_{lon}$ is unknown, but can be estimated as approximately equal to the longitudinal coordinate of the camera "$C_{lon}$". Further details for converting Cartesian coordinates into geospatial coordinates can be found in the reference: Ivan S. Ashcroft, "Projecting an Arbitrary Latitude and Longitude onto a Tangent Plane" Brigham Young University (Jan. 21, 1999).

Figure 16:
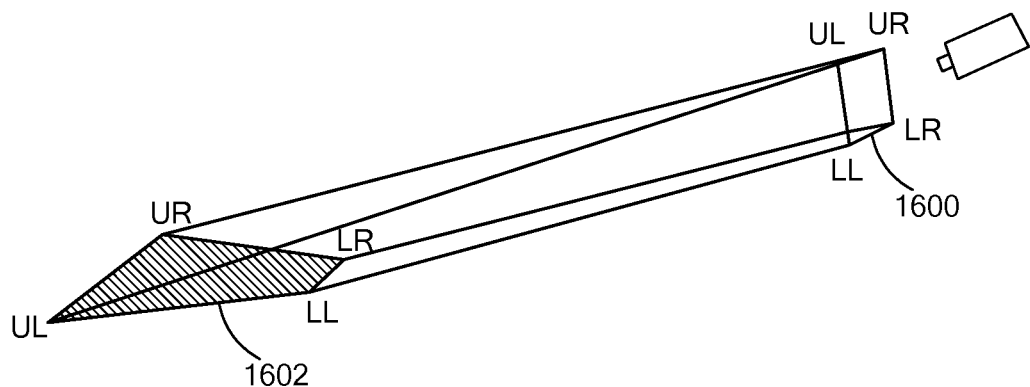
FIG. 16 shows a video image transposed into a polygonal view cone in accordance with one embodiment of the present invention.

In illustrative embodiments of the present invention, once the deltas "$\Delta_{lat}$ and $\Delta_{lat}$" are determined, they can be used to determine the geospatial coordinates ($P_{lat}$, $P_{lon}$, $P_{alt}$) for the corners 1504, 1506, 1508, and 1510 using Equations 24, 25, and 26, $$P_{lat} = C_{lat} + \Delta_{lat} \quad (24)$$

$$P_{lon} = C_{lon} + \Delta_{lon} \quad (25)$$

$$P_{alt} = C_{alt} \quad (26)$$

wherein ($C_{lat}$, $C_{lon}$, $C_{alt}$) are the known geospatial coordinates of the camera. Accordingly, in such an embodiment, the geospatial coordinates ($P_{lat}$, $P_{lon}$, $P_{alt}$) for the corners 1504, 1506, 1508, and 1510 are used to determine the view cone 1500 and the view cone is then displayed on the map. In more specific illustrative embodiments, the view cone is a polygon and the geospatial coordinates for the corners 1504, 1506, 1508, and 1510 are used to define the vertices 1512, 1514, 1516, and 1512 of the view cone 1500. FIG. 16 shows a video image 1600 with four corners transposed into a polygonal view cone 1602 with four vertices in accordance with one embodiment of the present invention.

In further illustrative embodiments of the present invention, the upper left 1512 and upper right vertices 1514 of the view cone 1500 are determined in a different manner. In some cases, when the tilt angle for the camera (or the effective tilt angle for at least one of the corners of the video feed) is above the horizon (e.g., $\phi$ is greater than 0), the transposition of the corners onto the map is not possible because the effective tilt angles for at least some of the corners never intersect the ground.

One illustrative method of resolving this issue, is to determine the upper left 1512 and upper right vertices 1514 of the view cone 1500 based upon a resolvable distance of the camera. The resolvable distance can be calculated using the resolution of the camera. Such an approach is advantageous because it better represents the true view field of the camera. In one illustrative embodiment, the view cone 1500 is displayed so that objects within the view cone can be identified in the video feed (e.g., objects within the resolvable distance), while objects beyond the view cone cannot be distinguished from the background (e.g., objects beyond the resolvable distance). In one illustrative embodiment, the resolvable distance corresponds to a distance at which a 4 meter long object (approximately the size of a vehicle) corresponds to two pixels on the display. In one embodiment, the resolvable distance is determined using Equation 27, $$D = \left| \frac{\frac{W}{2} \times R}{\tan(\Theta)} \right| \quad (27)$$

wherein W is the width of the video feed in pixels, R is the resolution of the camera in meters per pixel, and $\Theta$ is the horizontal angular field of view ($H_{FOV}$) 1520 divided by two. In some embodiments, the width of the video feed is communicated to a processor by the camera. In other illustrative embodiments, the width of the video feed is a fixed number, such as 320 pixels. FIG. 11 shows how the resolvable distance is calculated using a right triangle in accordance with one embodiment of the present invention. The calculated resolvable distance is then used to determine the upper left 1512 and upper right vertices 1514 of the view cone 1500.

In one illustrative embodiment, the resolvable distance is projected along the effective pan angles ($\theta$) for the upper left 1504 and upper right 1506 corners of the video feed. The "map" Cartesian coordinate ($X_P$, $Y_P$, $Z_P$) for the upper left 1512 and upper right 1514 vertices can be determined according to Equations 28, 29 and 30, $$X_P = (\sin(\theta) \times D) + X_C \quad (28)$$

$$Y_P = (\cos(\theta) \times D) + Y_C \quad (29)$$

$$Z_P = Z_C \quad (30)$$

wherein ($X_C$, $Y_C$, $Z_C$) are the "map" Cartesian coordinates for the camera. In illustrative embodiments of the present invention, the "map" Cartesian coordinates ($X_P$, $Y_P$, $Z_P$) for upper left 1512 and upper right 1514 vertices are then used to determine and display the view cone on the map. In other illustrative embodiments, these "map" Cartesian coordinates are converted into geospatial coordinates (e.g., using Equations 22-26) and then used to determine and display the view cone on the map.

In another illustrative embodiment, instead of projecting the resolvable distance along the effective pan angles ($\theta$) for the corners 1504 and 1506, the resolvable distance is projected along the pan angle ($\theta$) of the camera to a resolvable point. In some embodiments, the resolvable point is the center of the most distant edge of the view cone 1502. FIG. 18 shows a view cone 1800 with the center 1802 of its most distant edge as the resolvable point, in accordance with one embodiment of the present invention. The "map" Cartesian coordinate ($X_R$, $Y_R$, $Z_R$) for the resolvable point can be determined according to Equations 31, 32 and 33:

$$X_R = (\sin(\theta) \times D) + X_C \quad (31)$$

$$Y_R = (\cos(\theta) \times D) + Y_C \quad (32)$$

$$Z_R = Z_C \quad (33)$$

The resolvable point ($X_R$, $Y_R$, $Z_R$) is then rotated left and right by half the horizontal field of view ($H_{FOV}$) 1520 to determine the "map" Cartesian coordinates ($X_P$, $Y_P$, $Z_P$) for upper left 1804 and upper right 1806 vertices of the view cone. For the sake of computational efficiency in the processor, a matrix can be used to rotate the resolvable point. The "map" Cartesian coordinates ($X_P$, $Y_P$, $Z_P$) for upper left 1804 and upper right 1806 vertices are then used to determine and display the view cone on the map. In other illustrative embodiments, however, the "map" Cartesian coordinates are converted into geospatial coordinates and then used to determine and display the view cone on the map.

In yet further illustrative embodiments, the projections discussed in Equations 28-33 of this section are performed in the "camera" Cartesian Coordinate system and are then converted into the "map" Cartesian coordinate system using a mathematical transformation (or its transform).

Illustrative embodiments of the present invention are not limited for use with cameras that are characterized by pan, zoom, and tilt coordinates (e.g., pan-zoom-tilt cameras). For example, illustrative embodiments of the present invention may also be used with fixed cameras or other cameras that have a limited range of motion. Indeed, the above described methods of calibration and prioritization apply similarly to fixed cameras. Also, according to illustrative embodiments of the present invention, the view cone of the fixed camera can be modified as its zoom changes. Various embodiments of the present invention also have applicability to other types of cameras, such as cameras that are unable to shift their tilt orientation.

It should be noted that terms such as "system", "processor", "server", "input device", "display device", "communications network", and "database" may be used herein to describe devices that may be used in certain embodiments of the present invention and should not be construed to limit the present invention to any particular device type or system unless the context otherwise requires. Thus, a system may include, without limitation, a client, server, computer, appliance, or other type of device. Such devices typically include one or more network interfaces for communicating over a communication network (e.g., computer network) and a processor (e.g., a microprocessor with memory and other peripherals and/or application-specific hardware) configured accordingly to perform device and/or system functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies, networking technologies, and internetworking technologies.

It should also be noted that devices may use communication protocols and messages (e.g., messages created, transmitted, received, stored, and/or processed by the system), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, interfaces, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in at least one tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer-implemented method for calibrating at least one camera, the system including at least one camera, the method comprising:
    displaying a video feed from the at least one camera, the at least one camera having an orientation characterized by pan, zoom, and tilt coordinates;
    displaying a map of an area, the map being characterized by geospatial coordinates;
    allowing a user to select at least three pairs of points using at least one input device, a first point of the pair being selected in the map and a second point of the pair being selected from the video feed, the first point and the second point corresponding to the same geographic location;
    converting, in a computer process, the at least three points selected in the map from geospatial coordinates into Cartesian coordinates in three dimensions defined by a first three-dimensional coordinate system;
    converting, in a computer process, the at least three points selected in the video feed from pan, zoom, and tilt coordinates into Cartesian coordinates in three dimensions defined by a second three-dimensional coordinate system; and
    determining, in a computer process, a mathematical rotation between the first three-dimensional coordinate system and the second three-dimensional coordinate system based upon the Cartesian coordinates for the at least three pairs of points.

2. A method according to claim 1, wherein the mathematical rotation is a matrix.

3. A method according to claim 1, further comprising:
    displaying the location of the at least one camera on the map.

4. A method according to claim 1, wherein the geospatial coordinates are latitude, longitude, and altitude coordinates.

5. A method according to claim 1, wherein the input device is at least one of a mouse, a cursor, a crosshair, a touch screen, and a keyboard.

6. A method according to claim 1, further comprising:
    allowing the user to select at least one point in the map using the at least one input device;
    converting, in a computer process, the geospatial coordinates for the selected point into Cartesian coordinates in three dimensions defined by the first three-dimensional coordinate system;
    applying, in a computer process, the rotation to the Cartesian coordinates for the selected point to determine Cartesian coordinates in three dimensions defined by the second three-dimensional coordinate system;
    converting, in a computer process, the Cartesian coordinates defined by the second three-dimensional coordinate system into pan and tilt coordinates for the selected point; and
    providing orientation instructions to the at least one camera based upon the pan and tilt coordinates for the selected point.

7. A method according to claim 1, further comprising:
    receiving coordinates from a sensor for at least one target;
    if the coordinates for the at least one target are not Cartesian coordinates defined by the first three-dimensional coordinate system, converting, in a computer process, the coordinates into Cartesian coordinates in three dimensions defined by the first three-dimensional coordinate system;
    applying, in a computer process, the rotation to the Cartesian coordinates defined by the first three-dimensional coordinate system to determine Cartesian coordinates in three dimensions defined by the second three-dimensional coordinate system;
    converting, in a computer process, the Cartesian coordinates defined by the second three-dimensional coordinate system into pan and tilt coordinates; and
    providing orientation instructions to the at least one camera based upon the pan and tilt coordinates.

8. A method according to claim 7, further comprising:
    displaying the location of the at least one sensor on the map.

9. A method according to claim 7, further comprising:
    displaying the location of the at least one target on the map.

10. A method according to claim 1, wherein the video feed has upper left, upper right, lower left, and lower right corners, and the method further comprising:
    determining, in a computer process, effective pan and tilt angles for at least the lower left and lower right corners of the video feed based upon the pan, zoom, and tilt coordinates for the camera orientation;
    converting, in a computer process, the effective pan and tilt angles for at least the lower left and lower right corners of the video feed into Cartesian coordinates in three dimensions defined by the second three-dimensional coordinate system;
    applying, in a computer process, the rotation to the Cartesian coordinates defined by the second coordinate system to determine Cartesian coordinates in three dimensions defined by the first coordinate system for at least the lower left and lower right corners of the video feed;
    determining, in a computer process, a view cone using the Cartesian coordinates defined by the first coordinate system for at least the lower left and lower right corners of the video feed;
    determining, in a computer process, the view cone based upon the upper left and upper right corners of the video feed; and
    displaying the view cone on the map.

11. A method according to claim 10, wherein, when the tilt coordinate for the camera is below the horizon, determining the view cone based upon the upper left and upper right corners of the video feed comprises:
    determining, in a computer process, effective pan for the upper left and upper right corners of the video feed based upon the pan, zoom, and tilt coordinates for the camera orientation; and
    converting, in a computer process, the effective pan and tilt angles for the upper left and upper right corners of the video feed into Cartesian coordinates in three dimensions defined by the second three-dimensional coordinate system;
    applying, in a computer process, the mathematical rotation to the Cartesian coordinates to determine Cartesian coordinates in three dimensions defined by the first three-dimensional coordinate system for the upper left and upper right corners of the video feed; and determining, in a computer process, the view cone based upon the Cartesian coordinates, defined by the first three-dimensional coordinate system, for the upper left, upper right, lower left and lower right corners.

12. A method according to claim 11, wherein the view cone is a polygon and the Cartesian coordinates, defined by the first three-dimensional coordinate system, for the upper left, upper right, lower left and lower right corners are the vertices of the polygon.

13. A method according to claim 10, wherein, when the tilt coordinate for the camera is above the horizon, determining the view cone based upon the upper left and upper right corners of the video feed comprises:
   determining, in a computer process, effective tilt angles for the upper left and upper right corners of the video feed based upon the pan, zoom, and tilt coordinates for the camera;
   determining, in a computer process, coordinates in three dimensions, defined by the first three-dimensional coordinate system, for the upper left and upper right corners of the video feed based upon a resolvable distance of the camera; and
   determining, in a computer process, the view cone based upon the Cartesian coordinates, defined by the first three-dimensional coordinate system, for the upper left, upper right, lower left and lower right corners.

14. A method according to claim 13, wherein the view cone is a polygon and the Cartesian coordinates, defined by the first three-dimensional coordinate system, for the upper left, upper right, lower left and lower right corners are the vertices of the polygon.

15. Apparatus comprising at least one non-transitory computer readable medium encoded with instructions which when loaded on at least one computer, establish processes for calibrating at least one camera orientation characterized by pan, zoom, and tilt coordinates, the processes including:
   allowing a user to select at least three pairs of points using at least one input device, a first point of the pair being selected in a map characterized by geospatial coordinates and a second point of the pair being selected from a video feed from the at least one camera, the first point and the second point corresponding to the same geographic location;
   converting the at least three points selected in the map from geospatial coordinates into Cartesian coordinates in three dimensions defined by a first three-dimensional coordinate system;
   converting the at least three points selected in the video feed from pan, zoom, and tilt coordinates into Cartesian coordinates in three dimensions defined by a second three-dimensional coordinate system; and
   determining a mathematical rotation between the first three-dimensional coordinate system and the second three-dimensional coordinate system based upon the Cartesian coordinates for the at least three pairs of points.

16. An apparatus according to claim 15, wherein the instructions establish processes further including:
   converting the geospatial coordinates for a selected point into Cartesian coordinates defined by the first three-dimensional coordinate system;
   applying the rotation to the Cartesian coordinates for the selected point to determine Cartesian coordinates defined by the second three-dimensional coordinate system;
   converting the Cartesian coordinates defined by the second three-dimensional coordinate system into pan and tilt coordinates for the selected point; and
   providing orientation instructions to the at least one camera based upon the pan and tilt coordinates for the selected point.

17. An apparatus according to claim 15, wherein the instructions establish processes further including:
   receiving coordinates from a sensor for at least one target;
   if the coordinates for the at least one target are not Cartesian coordinates defined by the first three-dimensional coordinate system, converting the coordinates into Cartesian coordinates defined by the first three-dimensional coordinate system;
   applying the rotation to the Cartesian coordinates defined by the first three-dimensional coordinate system to determine Cartesian coordinates defined by the second three-dimensional coordinate system;
   converting the Cartesian coordinates defined by the second three-dimensional coordinate system into pan and tilt coordinates; and
   providing orientation instructions to the at least one camera based upon the pan and tilt coordinates.

18. An apparatus according to claim 15, wherein the instructions establish processes further including:
   determining effective pan and tilt angles for at least the lower left and lower right corners of the video feed based upon the pan, zoom, and tilt coordinates for the camera orientation;
   converting the effective pan and tilt angles for at least the lower left and lower right corners of the video feed into Cartesian coordinates defined by the second three-dimensional coordinate system;
   applying the rotation to the Cartesian coordinates defined by the second three-dimensional coordinate system to determine Cartesian coordinates defined by the first three-dimensional coordinate system for at least the lower left and lower right corners of the video feed;
   determining a view cone using the Cartesian coordinates defined by the first three-dimensional coordinate system for at least the lower left and lower right corners of the video feed;
   determining the view cone based upon the upper left and upper right corners of the video feed; and
   displaying the view cone on the map.

19. A surveillance system comprising:
   at least one camera having an orientation characterized by pan, zoom and tilt coordinates;
   a processor in communication with the at least one camera;
   at least one display in communication with the processor, the at least one display displaying a video feed from the at least one camera and a map of an area, the map being characterized by geospatial coordinates;
   at least one input device in communication with the processor allowing a user to select points on the video feed and the map;
   a memory storing instructions executable by the processor to perform processes that include:
      converting points selected in the map from the geospatial coordinates into Cartesian coordinates in three dimensions defined by a first three-dimensional coordinate system;
      converting points selected in the video feed from pan, zoom, and tilt coordinates into Cartesian coordinates in three dimensions defined by a second three-dimensional coordinate system; and determining a mathematical rotation between the first three-dimensional coordinate system and the second three-dimensional coordinate system based upon the Cartesian coordinates for at least three pairs of points, a first point of the pair having been selected in the map and a second point of the pair having been selected from the video feed.

20. The surveillance system of claim 19, wherein the mathematical rotation is a matrix.

21. The surveillance system of claim 19, wherein the geospatial coordinates are latitude, longitude, and altitude coordinates.

22. The surveillance system of claim 19, wherein the at least one input device is at least one of a mouse, a cursor, a crosshair, a touch screen, and a keyboard.

23. The surveillance system of claim 19, wherein the memory further stores instructions executable by the processor to perform processes that include:
  applying the mathematical rotation to the Cartesian coordinates defined by the first three-dimensional coordinate system for a point selected by the user in the map to determine Cartesian coordinates defined by the second three-dimensional coordinate system;
  converting the Cartesian coordinates defined by the second three-dimensional coordinate system into pan and tilt coordinates for the selected point; and
  providing orientation instructions to the at least one camera based upon the pan and tilt coordinates for the selected point.

24. The surveillance system of claim 19 further comprising a sensor connected to provide coordinates to the processor.

* * * * *